(12) United States Patent
Johnson et al.

(10) Patent No.: US 9,450,435 B2
(45) Date of Patent: Sep. 20, 2016

(54) BATTERY CHARGER AND METHOD UTILIZING ALTERNATING DC CHARGING CURRENT

(71) Applicant: SCHUMACHER ELECTRIC CORPORATION, Mt. Prospect, IL (US)

(72) Inventors: Thomas Finis Johnson, Schaumburg, IL (US); John S. Whiting, Hampshire, IL (US); John F. Waldron, Elgin, IL (US)

(73) Assignee: Schumacher Electric Corporation, Mt. Prospect, IL (US)

( * ) Notice: Subject to any disclaimer, the term of this patent is extended or adjusted under 35 U.S.C. 154(b) by 74 days.

(21) Appl. No.: 14/572,959

(22) Filed: Dec. 17, 2014

(65) Prior Publication Data
US 2015/0155733 A1 Jun. 4, 2015

Related U.S. Application Data

(63) Continuation of application No. 13/537,925, filed on Jun. 29, 2012, now Pat. No. 8,947,054, which is a continuation of application No. 11/487,071, filed on Jul. 14, 2006, now Pat. No. 8,237,412.

(60) Provisional application No. 60/700,059, filed on Jul. 15, 2005.

(51) Int. Cl.
*H02J 7/00* (2006.01)
*H01M 10/44* (2006.01)
*H01M 10/46* (2006.01)
*H02J 7/14* (2006.01)
*H02J 7/02* (2016.01)

(52) U.S. Cl.
CPC ............ *H02J 7/0052* (2013.01); *H02J 7/0003* (2013.01); *H02J 7/0093* (2013.01); *H02J 7/02* (2013.01)

(58) Field of Classification Search
CPC ..... Y02E 60/12; H02J 7/0042; H02J 7/0045; H02J 7/0047; H02J 7/008; H02J 7/0073; H02J 7/0081; H01M 10/46; H01M 10/44; G01R 31/3648; G01R 31/3651; G01R 31/3624
USPC ....................................................... 320/107
See application file for complete search history.

(56) References Cited

U.S. PATENT DOCUMENTS

| | | |
|---|---|---|
| 3,927,361 A | 12/1975 | Macharg |
| 3,944,904 A | 3/1976 | Hase |
| 4,862,013 A | 8/1989 | Konopka |
| 5,049,804 A | 9/1991 | Hutchings |
| 5,382,893 A | 1/1995 | Dehnel |
| 5,408,170 A | 4/1995 | Umetsu et al. |
| 5,602,462 A * | 2/1997 | Stich ................. G05F 1/147 307/64 |
| 5,646,506 A | 7/1997 | Suzuki |
| 5,680,031 A | 10/1997 | Pavlovic et al. |
| 5,726,554 A | 3/1998 | Freiman et al. |
| 6,040,684 A | 3/2000 | Mitchell |
| 6,060,865 A | 5/2000 | Chen |
| 6,392,348 B1 * | 5/2002 | Dougherty ............ H02J 7/1423 315/82 |
| 6,414,465 B1 | 7/2002 | Banks et al. |
| 6,476,585 B1 | 11/2002 | Simmonds |
| 6,495,992 B1 | 12/2002 | Pavlovic |
| 6,577,517 B2 | 6/2003 | Jain et al. |
| 6,985,034 B1 * | 1/2006 | Prokin ................. H02M 1/44 330/207 A |
| 2001/0033156 A1 * | 10/2001 | Buono ................ H02M 3/1563 323/282 |
| 2002/0000788 A1 * | 1/2002 | Ostergaard ............ H02J 7/0004 320/128 |
| 2003/0039130 A1 * | 2/2003 | Curtiss .................... G05F 1/613 363/37 |
| 2004/0075418 A1 | 4/2004 | Densham et al. |
| 2005/0088144 A1 | 4/2005 | Pacholok et al. |
| 2007/0114970 A1 | 5/2007 | Johnson et al. |
| 2015/0171647 A1 * | 6/2015 | Zhao .................... H02J 7/0029 320/107 |

OTHER PUBLICATIONS

International Search Report, Mailed Oct. 25, 2005, PCT/US04/32412.
International Search Report, Mailed Sep. 20, 2007, PCT/US06/27381.

* cited by examiner

*Primary Examiner* — Arun Williams
(74) *Attorney, Agent, or Firm* — Michael Stanley Tomsa; McAndrews, Held & Malloy, Ltd.

(57) ABSTRACT

A battery charger is disclosed for use with various batteries, such as automotive- and marine-type batteries. In accordance with an aspect of the invention, the charging current is alternated between non-zero DC charging current levels. By alternating the charging current between non-zero DC charging levels, the battery can be charged to a higher capacity (i.e., ampere hours) faster, thus reducing the charging time and at the same time allow the rating of the battery charger to be increased. In accordance with another important aspect of the invention, the technique for alternating the charging current can be implemented in both linear- and switched-mode battery chargers.

20 Claims, 23 Drawing Sheets

Linear Wheeled SpeedCharge Power

BATTERY CHARGER AND METHOD UTILIZING ALTERNATING DC CHARGING CURRENT

CROSS REFERENCE TO RELATED APPLICATIONS

This application is a continuation of commonly owned U.S. patent application Ser. No. 13/537,925, filed on Jun. 29, 2012, which is a continuation of U.S. patent application Ser. No. 11/487,071, filed on Jul. 14, 2006, which claims priority to U.S. Provisional Patent Application No. 60/700,059, filed Jul. 15, 2005, each of which are hereby incorporated by reference.

TECHNICAL FIELD OF THE INVENTION

The present invention relates to a battery charger and more particularly a battery charger for use with various types of batteries, including automotive- and marine-type batteries for both linear- and switched-mode battery chargers in which the DC charging current is alternated between non-zero average DC charging current levels, which allows the charging time to be reduced and also increases the capacity of the battery charger.

BACKGROUND

Various types of battery chargers are known in the art. The two most common types of battery chargers are known as linear- and switched-mode battery chargers. Linear-mode battery chargers provide an output voltage that is a linear function of the input voltage. Unused charging power is simply dissipated. Switched-mode battery chargers are more efficient. With such switched-mode battery chargers, only slightly more than the input power required to generate the charging voltage and current is consumed to exist with such switched-mode battery chargers.

The charging characteristics of a battery charger are normally configured to match the battery chemistry of the battery to be charged. For example, lead acid batteries, frequently used in automotive and marine applications, are often charged with constant power, constant current or constant voltage or a combination thereof. Such batteries are known to be charged with both linear- as well as switched-mode battery chargers. U.S. Patent Application Publication No. US 2005/0088144 A1, assigned to the same assignee as the assignee of the present invention, discloses an example of a switched-mode battery charger for automotive and marine battery applications.

Many different considerations affect the selection of a particular battery chemistry for a particular application. For example, lead acid batteries are normally used in automotive and marine battery applications because of the ability to deliver relatively large amounts of power. In automotive applications, an initial burst of power is required to start the engine. In marine applications, such as U.S. Coast Guard applications, the battery capacity is an important consideration for use in buoys, deployed by the United States Coast Guard in the oceans surrounding the U.S. to transmit weather information to mariners. Such buoys are also used for navigation.

Battery capacity is normally measured in terms of ampere hours. Theoretically, the ampere hour capacity is the number of hours that the battery can deliver a specified level of output current. Due to losses within the battery, the ampere-hour output capability of a battery is known to be slightly less than the ampere-hour input.

During charging, it is necessary to charge the battery to its fully-charged condition without exceeding the voltage, current, or temperature, which may damage the battery, as specified by the battery manufacturer. An exemplary battery charging characteristic curve for an exemplary marine battery is illustrated in FIG. 1. In this example, the charging current is illustrated by the curve 20. The maximum charging current is limited by various parameters set forth by the battery manufacturer, such as temperature cut-off (TCO), the rate of change of temperature with respect to time (dT/dt), current, and other parameters. The battery charging temperature is identified with the curve 22. The curve 24 illustrates the battery voltage, while the curve 26 illustrates the ambient air temperature. In this particular example, the maximum charging current is limited to a value slightly greater than 40 amperes during a constant current mode during a time period t1. Based upon the charging characteristics illustrated in FIG. 1, the end of a nominal charging cycle is shown at the point 27. The ampere hours applied to the battery by the charger can be obtained by integrating the area under the curve 20. In this exemplary case, the ampere hours input to the battery is 40.65 Ah.

As mentioned above, due to internal losses within the battery, the output capacity of the battery will be slightly lower than 40.65 ampere hours. An exemplary discharge curve is illustrated in terms of FIG. 2. As shown, a fully charged exemplary battery in accordance with FIG. 1 is discharged at 10 amps while measuring the terminal voltage. For a nominal 12-volt automotive battery, the battery is discharged at 10 amps until the terminal voltage reached about 10.5 amps, which was about 235 minutes, as indicated by the point 29. The output capacity is thus 10 amperes×235 minutes×1 hour/60 minutes or about 39.2 ampere hours.

There are several problems with known chargers. First, the charging times are relatively long. Second, the charging characteristics of known battery chargers require such battery chargers to be rated at relatively low values.

SUMMARY

The present invention relates to a battery charger for use with various types of batteries, such as automotive- and marine-type batteries. In accordance with an aspect of the invention, the charging current is alternated between non-zero charging current levels. By alternating the DC charging current between two non-zero charging levels, the battery can be charged to a higher capacity (i.e., ampere hours) faster, thus reducing the charging time and at the same time allowing the rating of such chargers to be used in relatively higher current applications. In accordance with another important aspect of the invention, the technique for alternating the average DC charging current can be implemented in both linear- and switched-mode battery chargers.

DESCRIPTION OF THE DRAWINGS

These and other advantages of the present invention will be readily understood with reference to the following specification and attached drawings wherein.

DETAILED DESCRIPTION

The present invention relates to a battery charger and a method for fast charging a battery and increasing the discharge capacity of a battery. The battery charger is for use, for example, with various types of batteries, such as automotive- and marine-type batteries, lead acid batteries, deep cycle batteries, AGM batteries, and other battery types and can be implemented in both linear- and switched-mode battery charger topologies. In accordance with an important aspect of the invention, the average DC charging current is alternated between non-zero charging current levels. By alternating the average DC charging current between non-zero charging levels, the battery can be charged to higher levels, thus providing increased output capacity and it can also be charged much faster.

Figure 3:
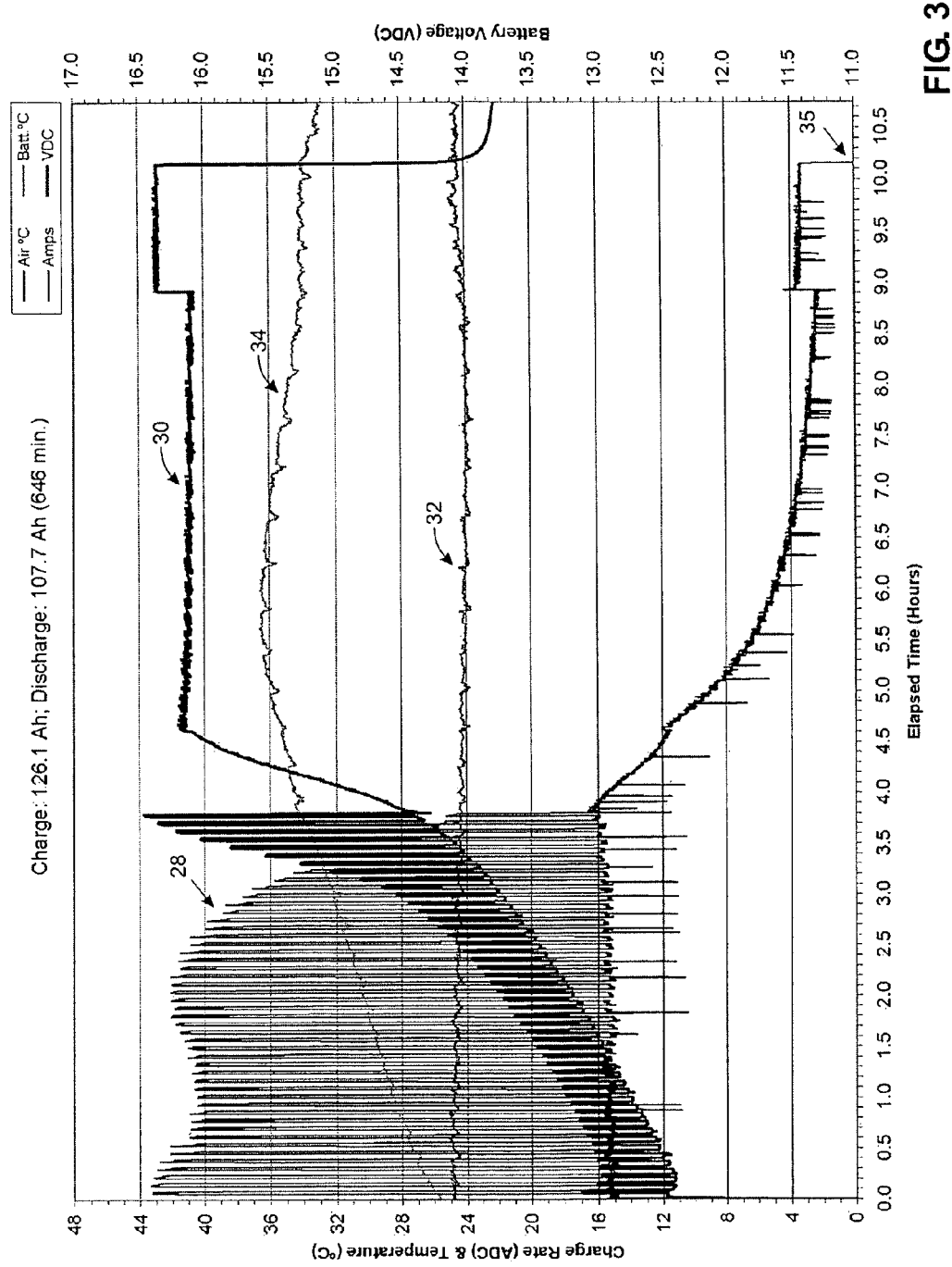
FIG. 3 is an exemplary charging curve of an exemplary marine battery by a battery charger in accordance with the present invention.
Figure 4:
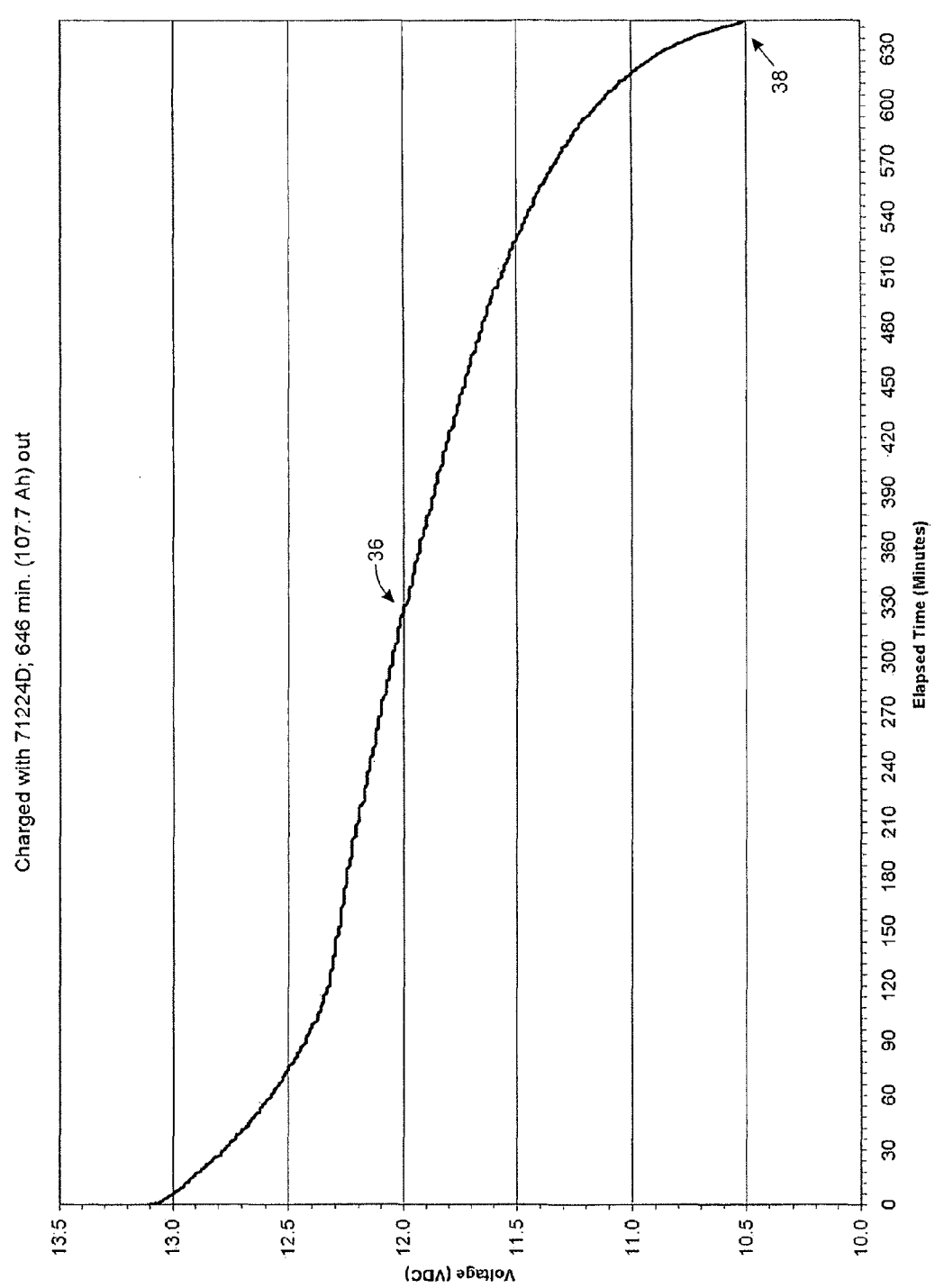
FIG. 4 is an exemplary discharge curve for the battery illustrated in FIG. 3.

An exemplary charging curve for the battery charger, in accordance with the present invention is illustrated in FIG. 3, while an exemplary discharge curve is illustrated in FIG. 4. Referring first to FIG. 3, the charging current is illustrated by the curve, generally identified by the reference numeral 28. The charging voltage is illustrated by the curve 30, while the ambient temperature is illustrated by the curve 32. The battery temperature is indicated by the curve 34. As shown, the curve 28 illustrates that during a first phase of the battery charger, identified as t1, the average DC charging current waveform alternates between two non-zero values with the minimum value being around 15 amperes and the maximum value being a little over 40 amperes. The minimum and maximum charging current values have periods in seconds, tens of seconds, etc. Each period of the minimum and maximum charging currents represents the DC average of a number of DC charging pulses which vary between zero amperes and some positive DC value. For example, linear-mode battery chargers are known to generate charging current pulses at 120 Hertz. Switched mode battery chargers are known to generate charging current pulses at much higher frequencies. Nonetheless, these charging current pulses, whether generated by a linear-mode battery charger or a switched-mode battery charger, have a predetermined duty cycle, frequency, and magnitude and may be averaged over a specific time period to determine their average value, for example, as measured by a DC ammeter. The present invention is concerned with varying the average value of the charging current pulses for both linear- and switched-mode battery chargers between two non-zero values. For example, as illustrated in FIG. 3, the DC average value is varied between 15 amperes and 40 amperes.

As illustrated in FIG. 3, the fully-charged condition is illustrated by the point 35 at about 10.3 hours. As mentioned above, the total input capacity to the exemplary battery is represented by the area under the curve 28. In this example, the battery was charged with 126.1 ampere hours; over three times the input charge to the same type of battery illustrated in FIGS. 1 and 2.

Figure 1:
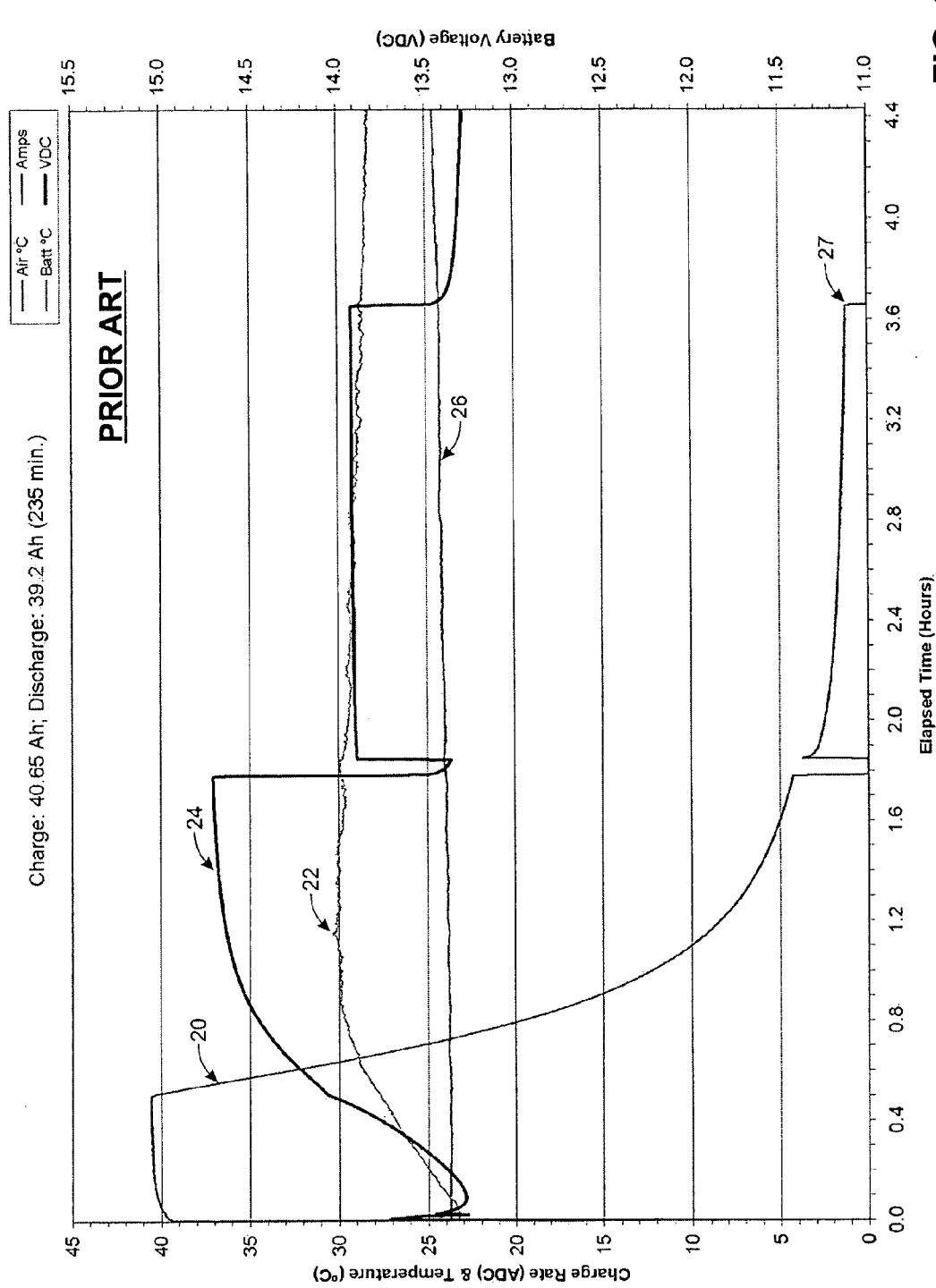
FIG. 1 is an exemplary charging curve of an exemplary marine battery by a known battery charger.
Figure 2:
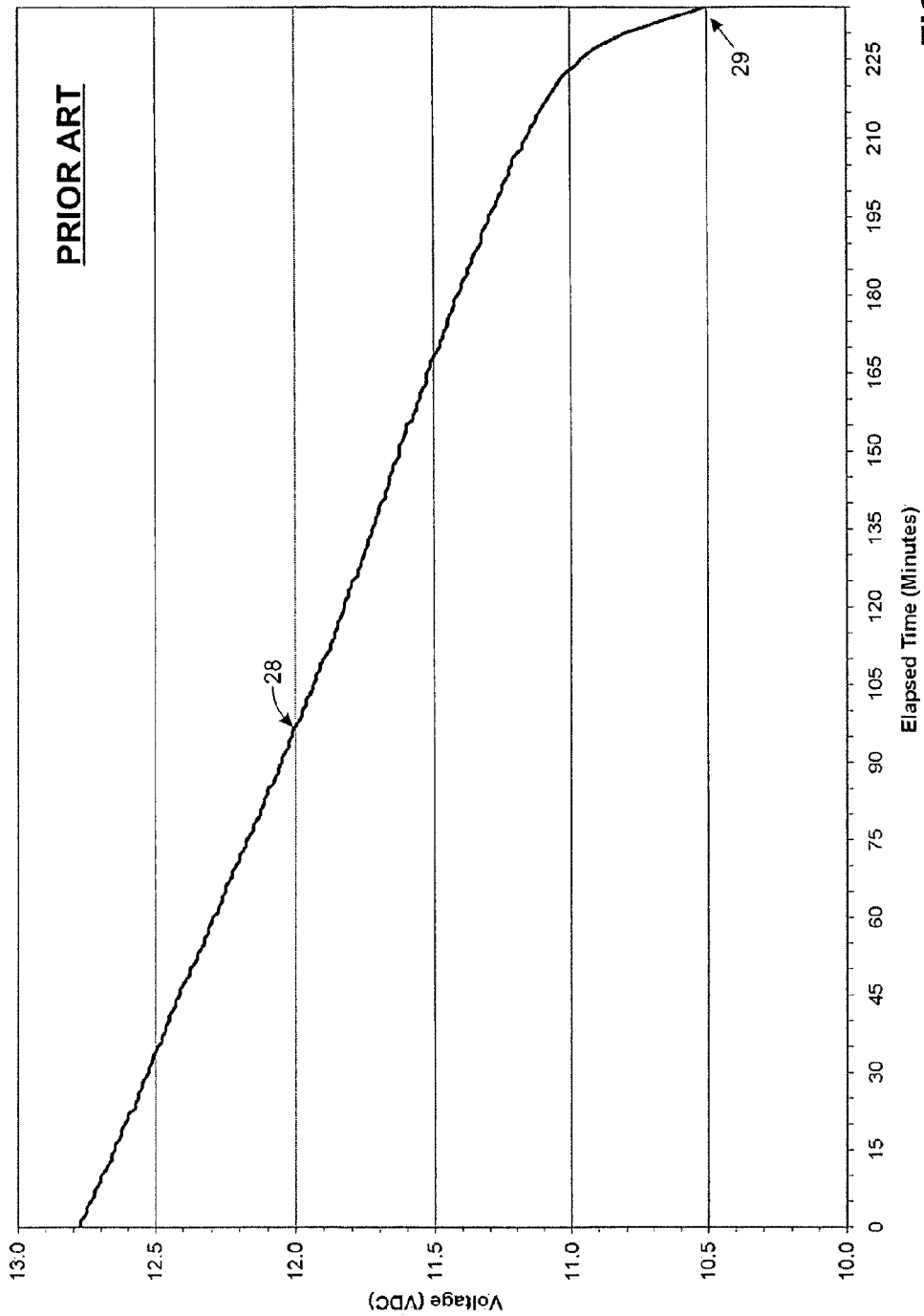
FIG. 2 is an exemplary discharge curve for the exemplary marine battery utilized in connection with FIG. 1.

As mentioned above, the discharge capacity of a battery is slightly less than the input charge due to internal losses within the battery. As illustrated in FIG. 4, the battery was discharged at 10 amperes until the terminal voltage reached 10.5 volts. As indicated by the point 38, the battery was considered to be discharged at the point 38, or at about 646 minutes. The discharge capacity is thus 10 amperes×646 minutes×one hour/60 minutes or about 107.7 ampere hours: a 150 percent improvement over the battery capacity when charged by the known battery charger as illustrated in FIGS. 1 and 2.

The alternating DC charging waveforms provide several benefits. First, the charger, in accordance with the present invention, allows more energy to be pumped into the battery faster, thereby decreasing the charging time. Secondly, the charger, in accordance with the present invention, allows the rating of a battery charger to be increased. For example, using the technique, in accordance with the present invention, allows, for example, a 15-amp battery charger to be used in a 40-amp application.

Figure 5:
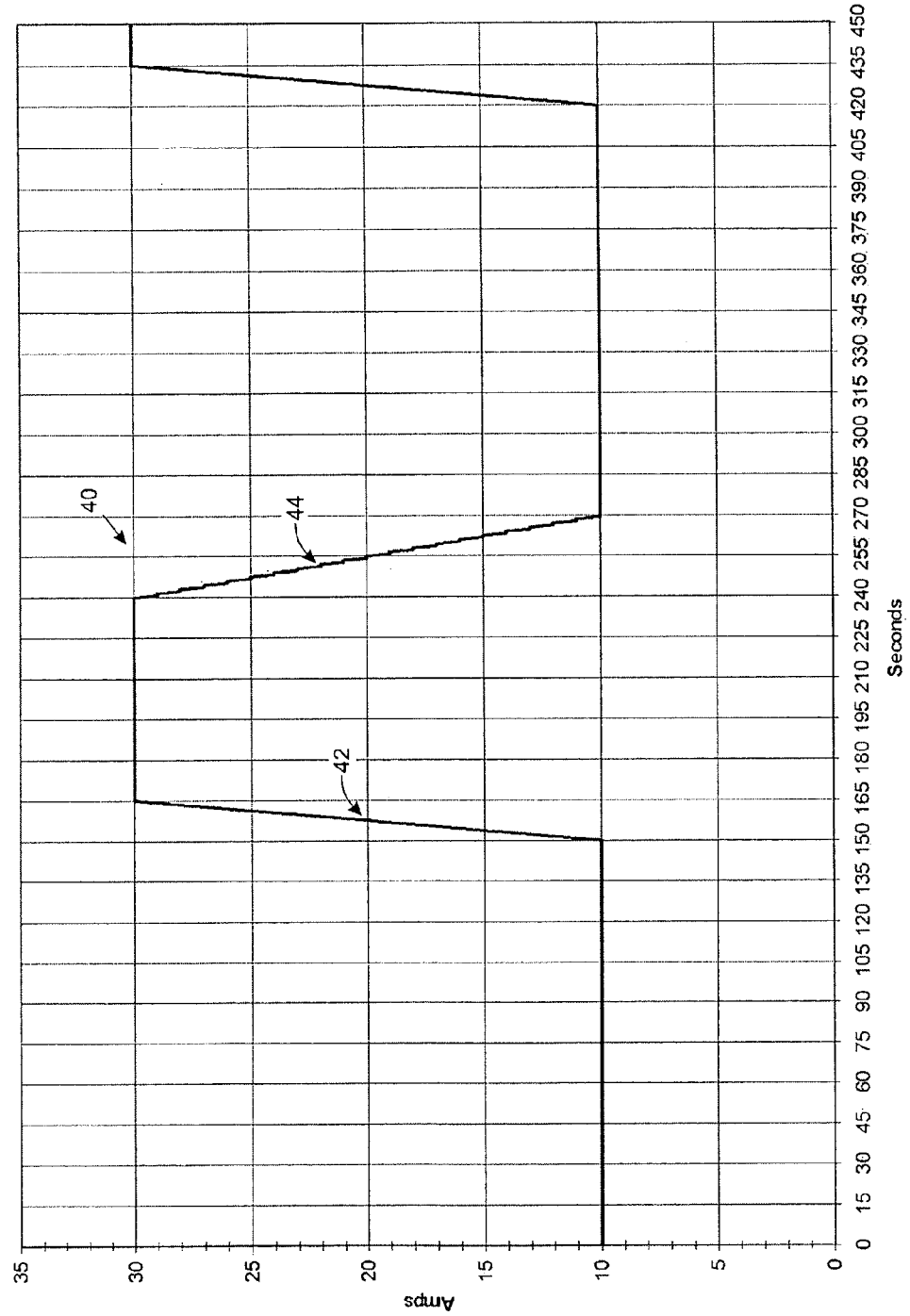
FIG. 5 is a diagram of an exemplary charging cycle generated by a switched-mode battery charger in accordance with the present invention.

In accordance with an important aspect of the invention, the DC alternating charging current technique is applicable to both linear- and switched-mode battery chargers. FIG. 5 illustrates an exemplary average DC charging current waveform for a switched-mode charger, while FIG. 6 illustrates exemplary waveforms for both linear- and switched-mode chargers.

As shown in FIG. 5, an exemplary waveform, identified with the reference numeral 40, alternates between two non-zero average DC current values, 10 amperes and 30 amperes, having a period of 270 seconds (420-150) or 4.5 minutes. As shown, the exemplary waveform provides an average DC charging current 30 amperes for 75 seconds (240-165) and an average DC charging current of 10 amperes for 150 seconds (420-270) for a total of 225 seconds.

As shown, the current waveform may not be a perfect square wave because of the relatively high frequency of the actual DC charging pulses (as measured by an oscilloscope) and, instead, may ramp up and ramp down between the two non-zero values. For example, as illustrated in FIG. 5, a rising edge of the waveform 40, identified with the reference numeral 42, ramps between a first non-zero DC value of 10 amperes to a second non-zero DC current value of 30 amperes in one exemplary incremental time period, for example, 15 seconds. The falling edge of the waveform 40, identified with the reference numeral 44, drops between a nominal 30 amps and 10 amps in two exemplary incremental time periods, for example, 30 amps.

Figure 6:
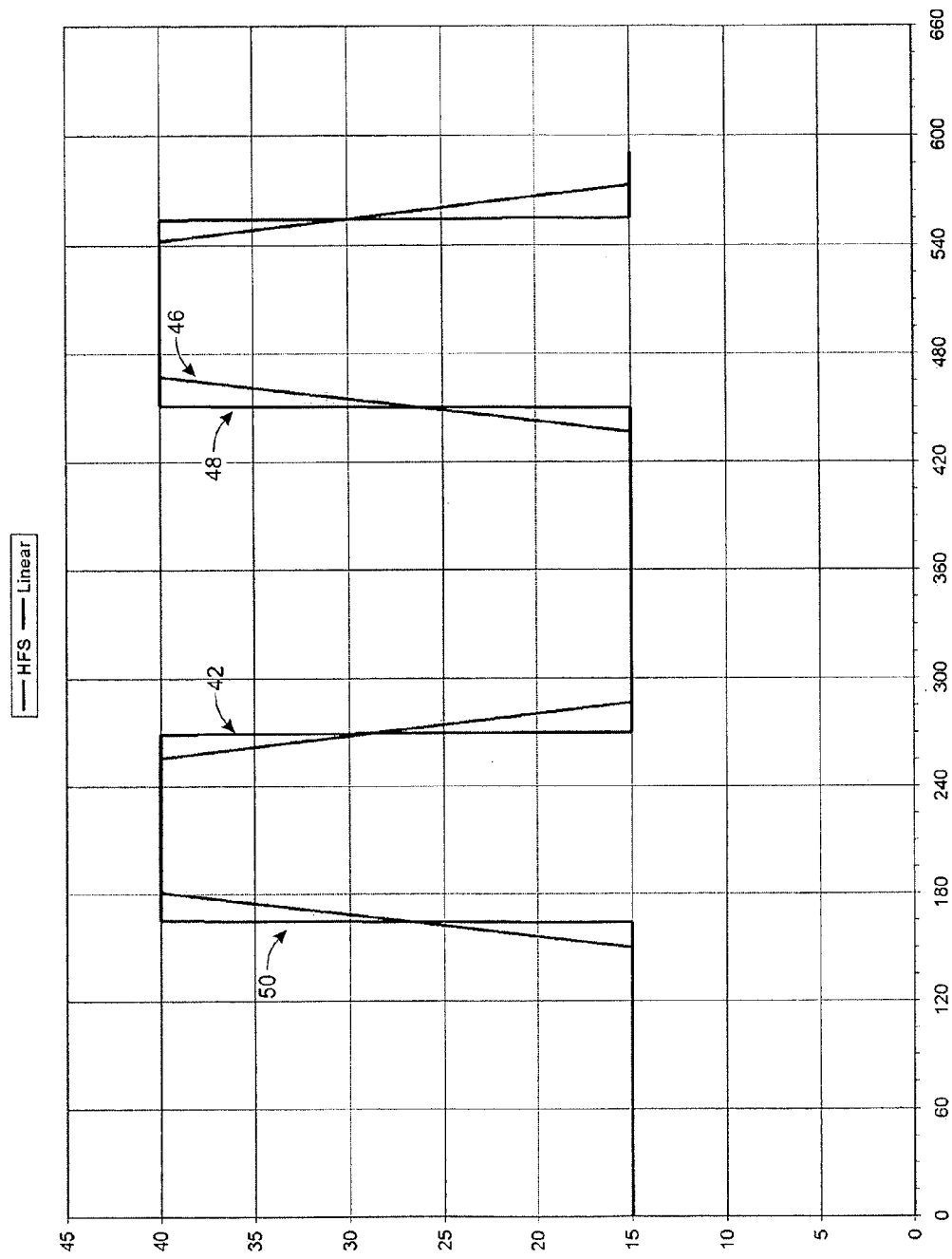
FIG. 6 is a diagram illustrating exemplary charging cycles generated by both switched-mode and a linear-mode battery charger, superimposed on the same graph, in accordance with the present invention.

FIG. 6 illustrates other exemplary charging waveforms. In particular, FIG. 6 illustrates exemplary DC charging current waveforms which alternate between 15 amperes DC and 40 amperes DC for both switched-mode and linear-mode battery chargers. In particular, the curve 46 illustrates a switched-mode charging waveform, similar to FIG. 5. The curve 48 illustrates exemplary alternating charging waveforms for a linear-mode battery charger. As shown, the waveforms for the linear-mode battery charger are generally square waves in which the rising 50 and falling 52 edges of the waveform are virtually perpendicular to the horizontal axis.

It is to be understood that the principles of the present invention are applicable to various waveform configurations having various periods. It should also be apparent that the alternating DC current charging waveforms in a charging cycle need not be uniform. For example, the waveforms may vary between different upper and lower DC current values within the same charging cycle or may be relatively constant. Also, the periods of the waveforms may vary within a particular charging cycle. All such embodiments are contemplated to be within the present scope of the invention.

Figure 7A:
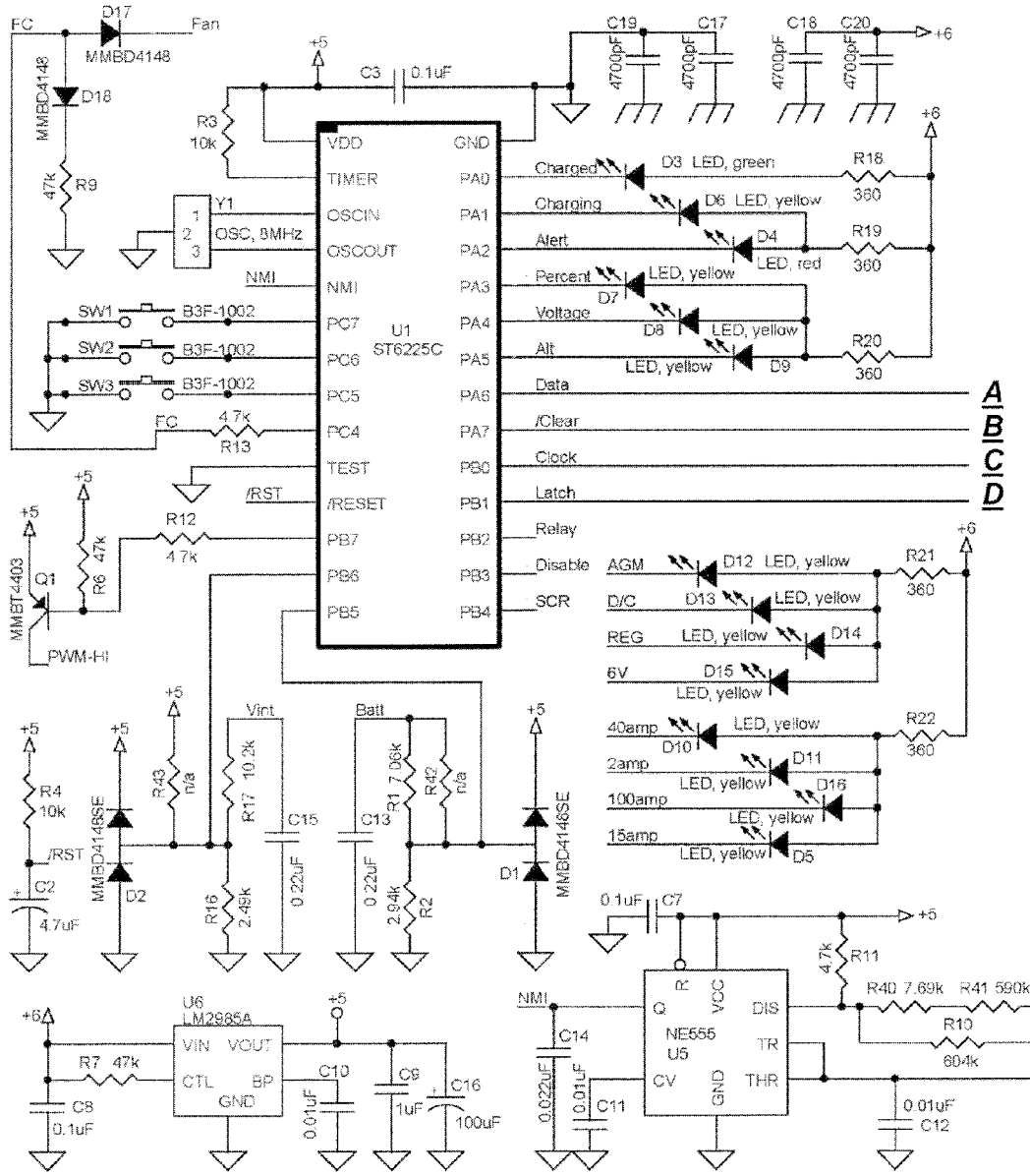
FIGS. 7A and 7B illustrate an exemplary schematic for a control board for an exemplary 100-amp switched-mode battery charger, for use with the present invention.
Figure 7:
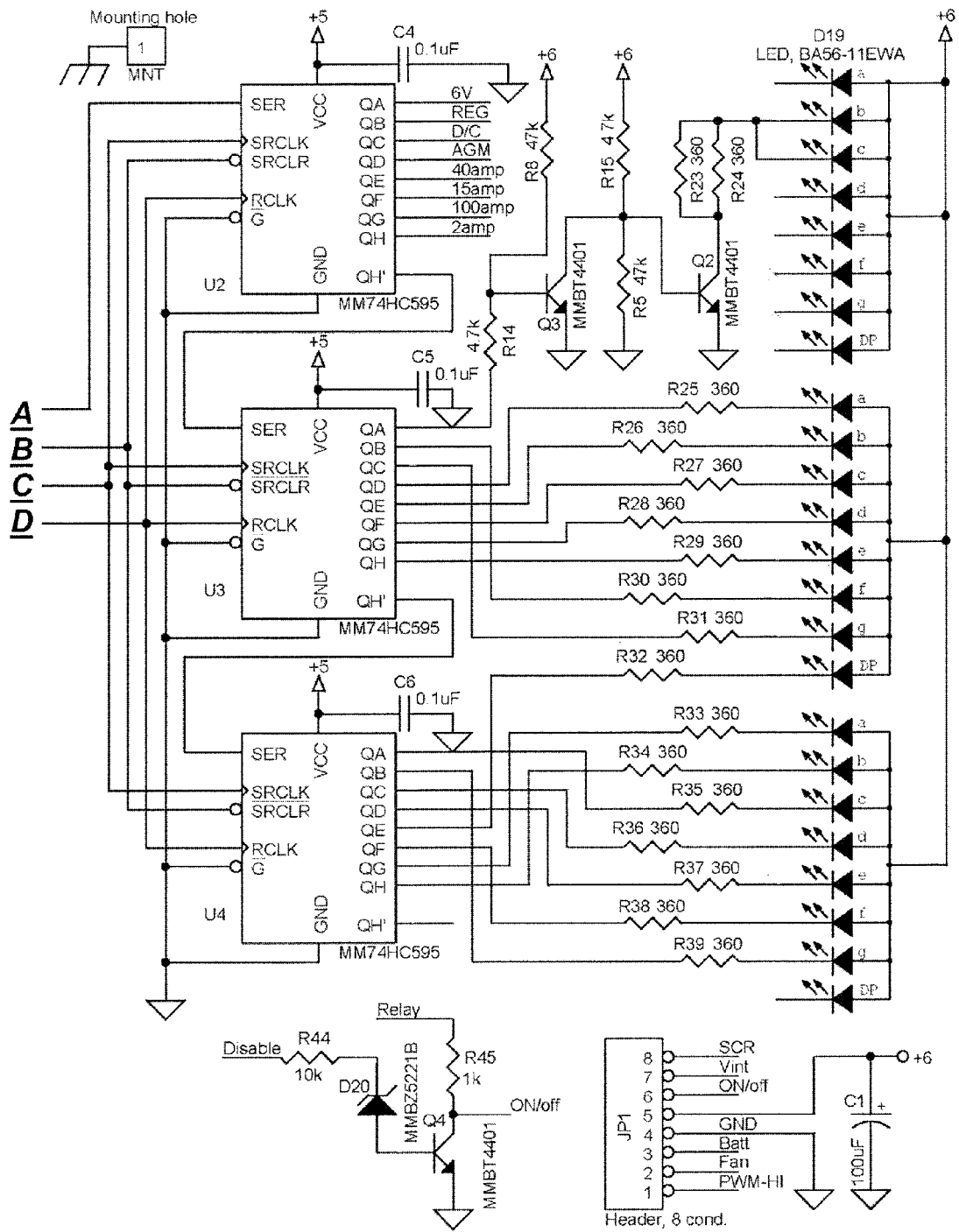
Figure 8:
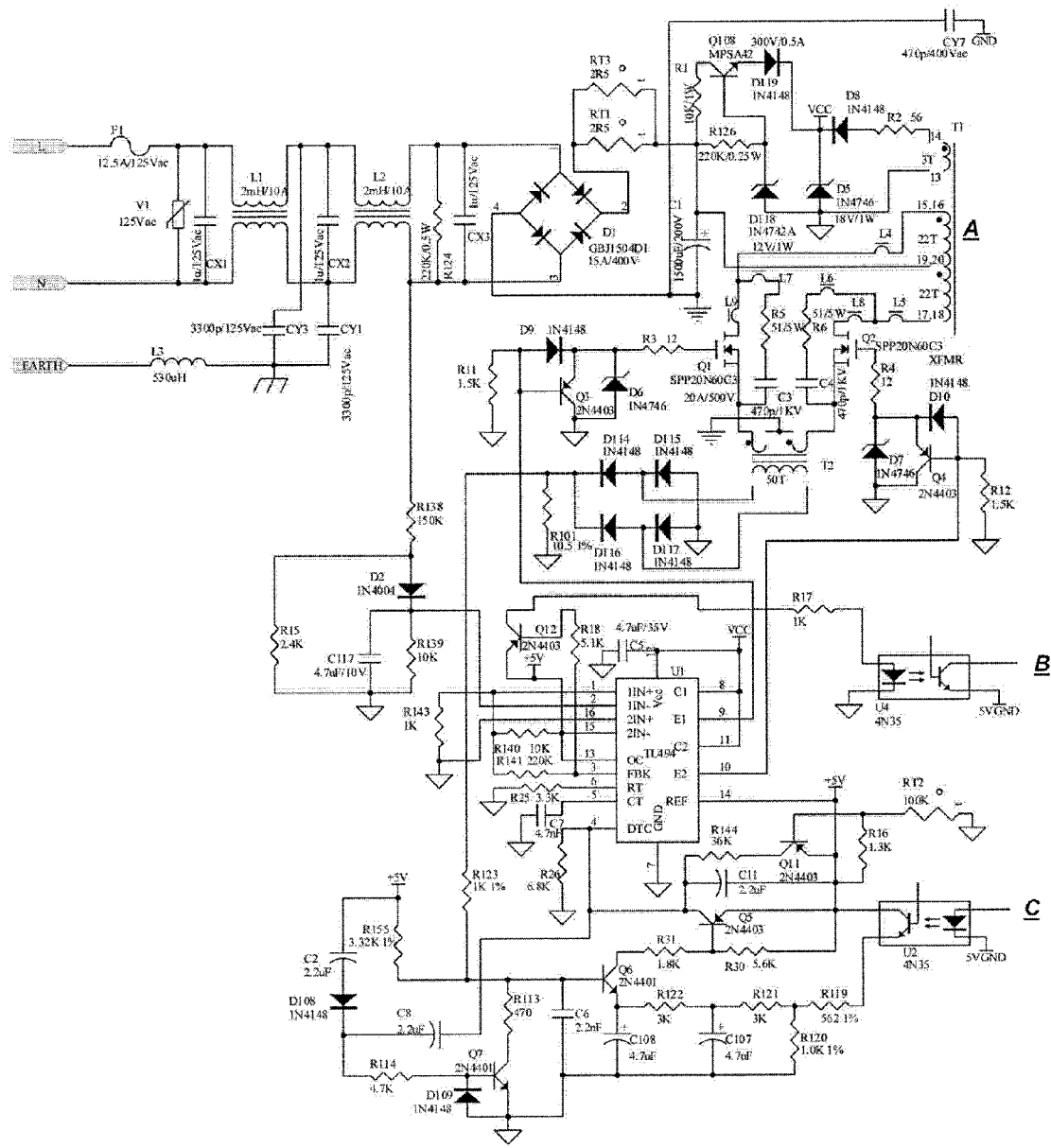
FIGS. 8A and 8B illustrate an exemplary schematic for a power board for the 100-amp switched-mode battery charger illustrated in FIGS. 7A and 7B.
Figure 8:
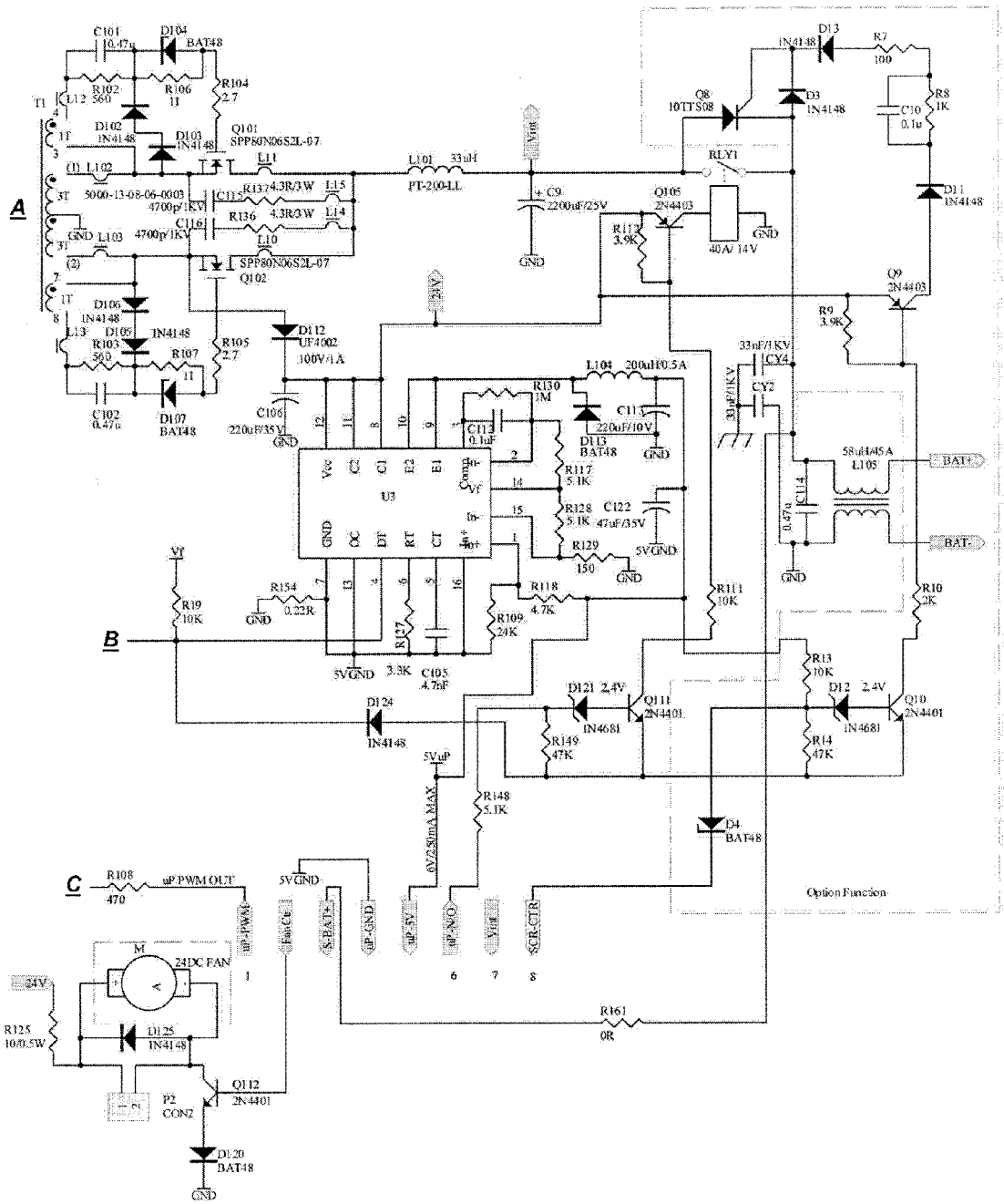
Figure 9A:
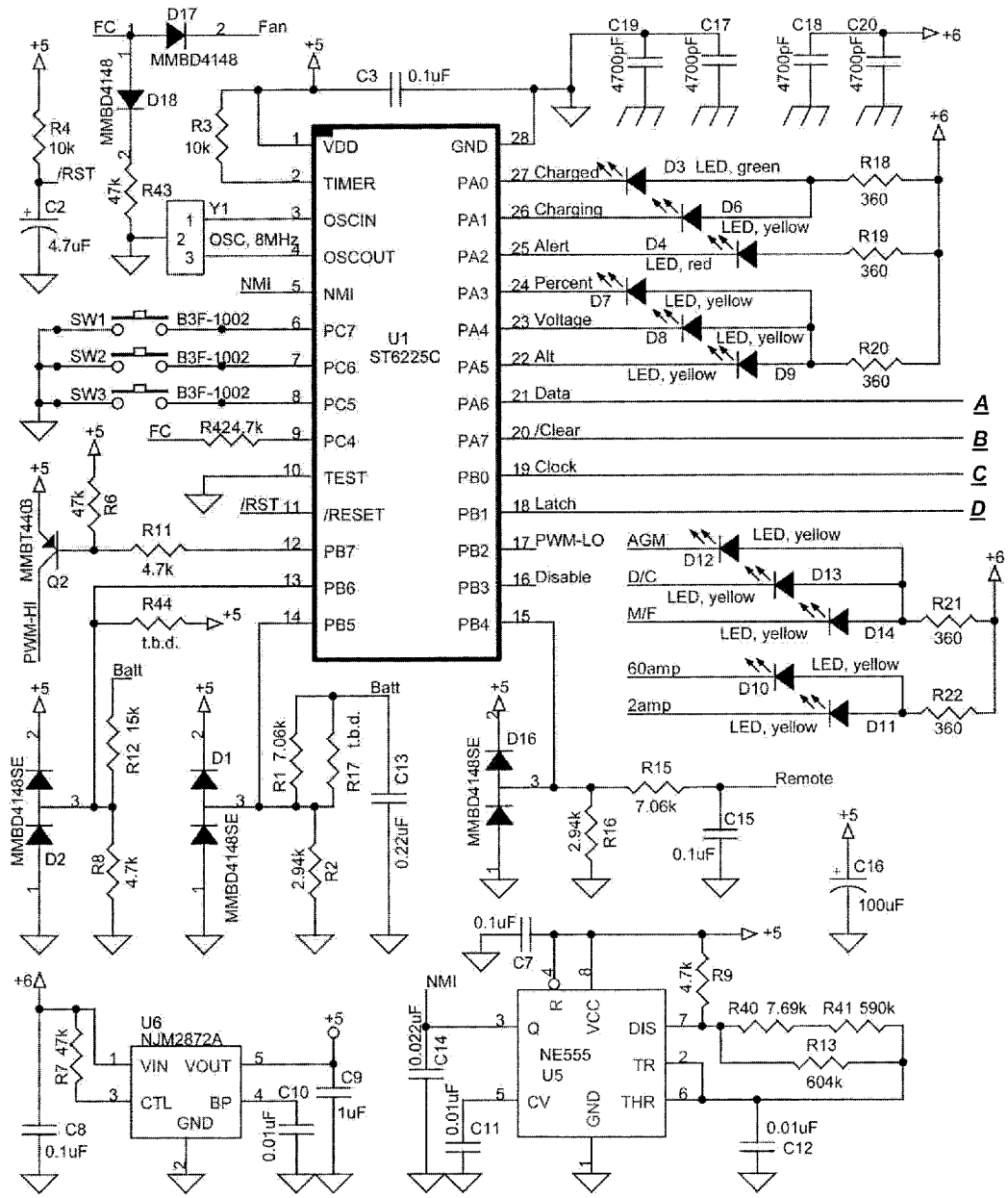
FIGS. 9A and 9B illustrate an exemplary schematic diagram of a control board for an exemplary 60-amp high-frequency switched-mode-type battery charger.
Figure 9B:
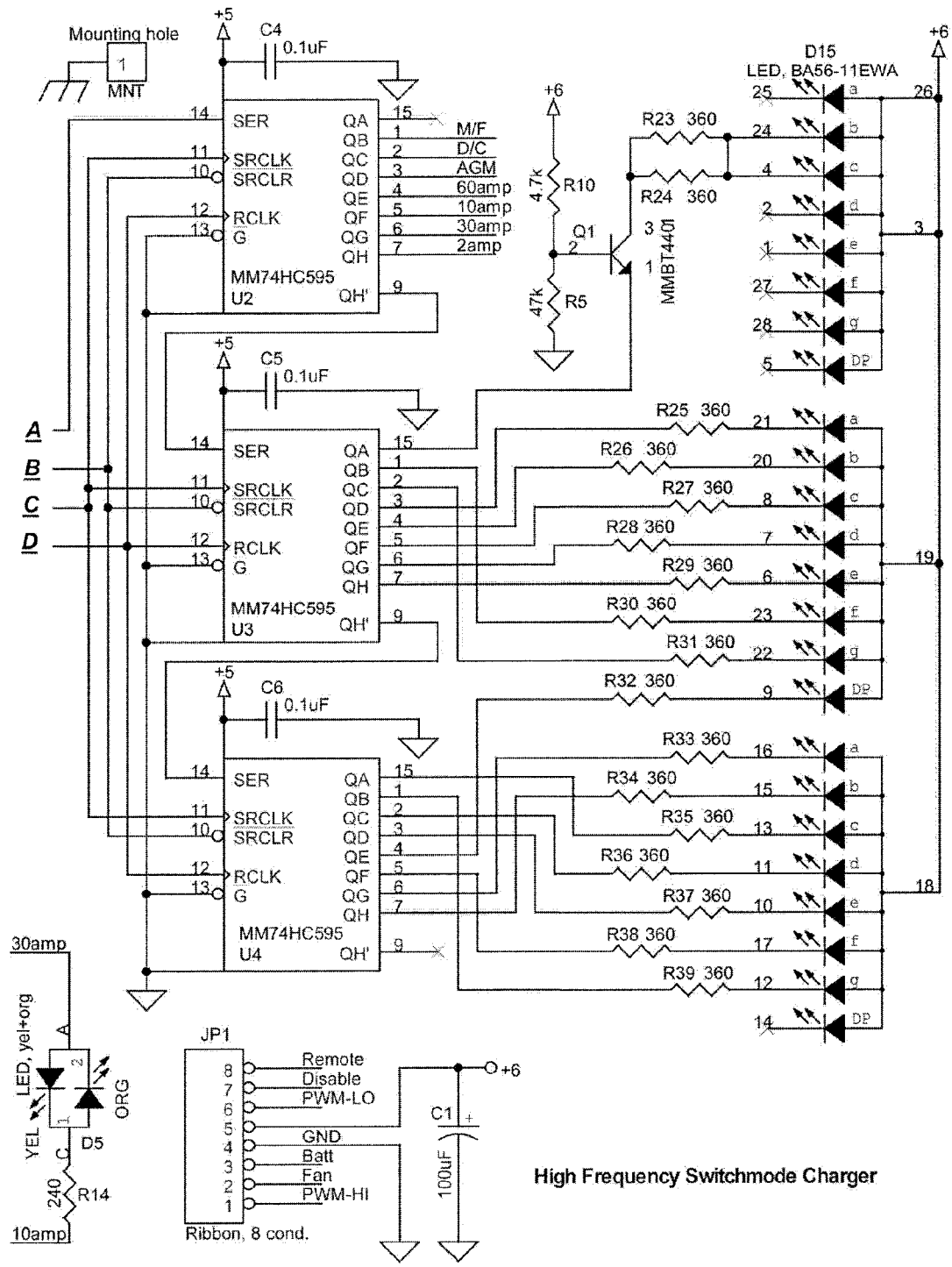
Figure 10A:
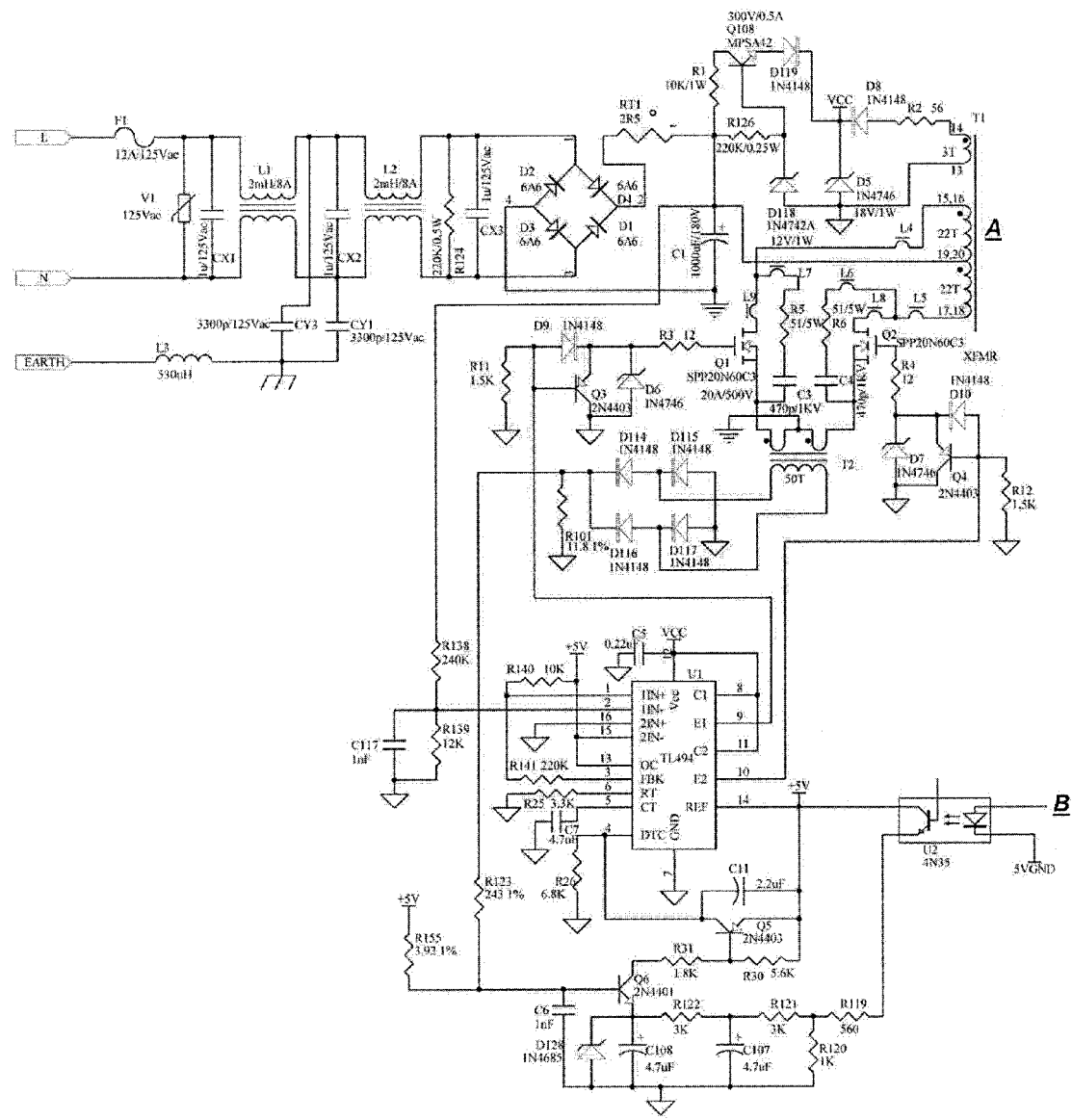
FIGS. 10A and 10B illustrate an exemplary schematic diagram for a power board for the 60-amp battery charger illustrated in FIGS. 9A and 9B.
Figure 10B:
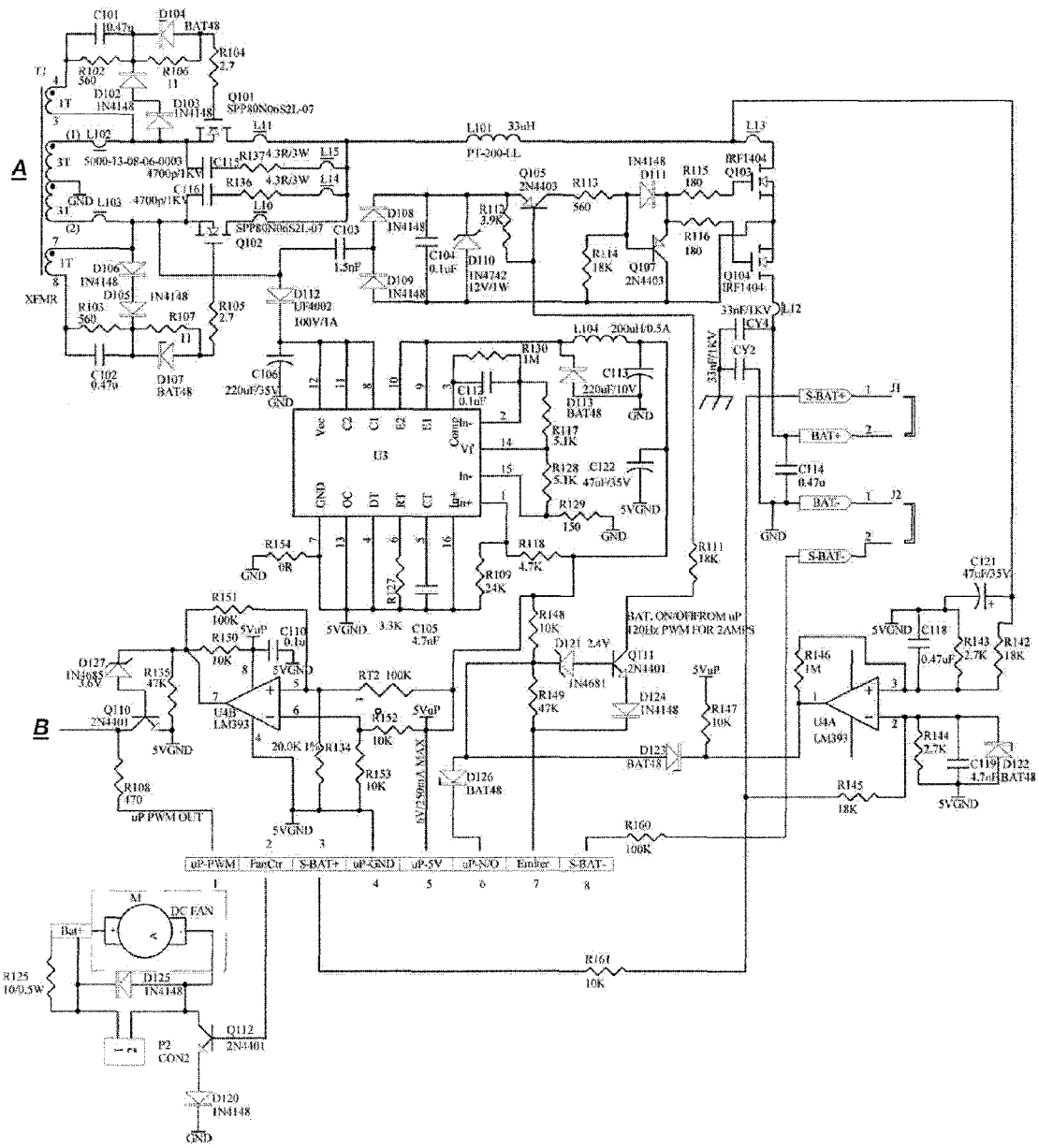
Figure 11:
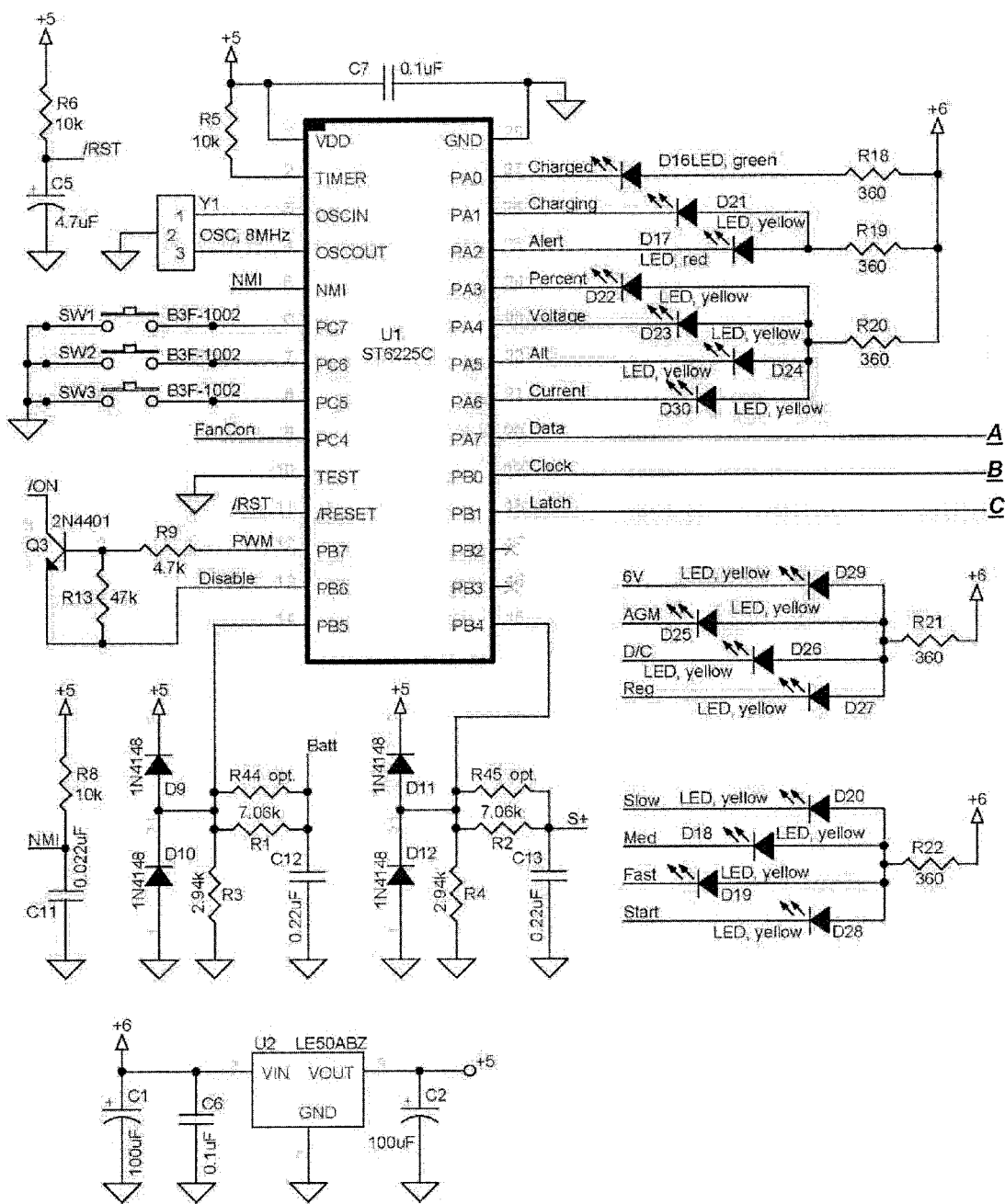
FIGS. 11A and 11B illustrate an exemplary schematic for a control board for a linear-mode battery charger.
Figure 11B:
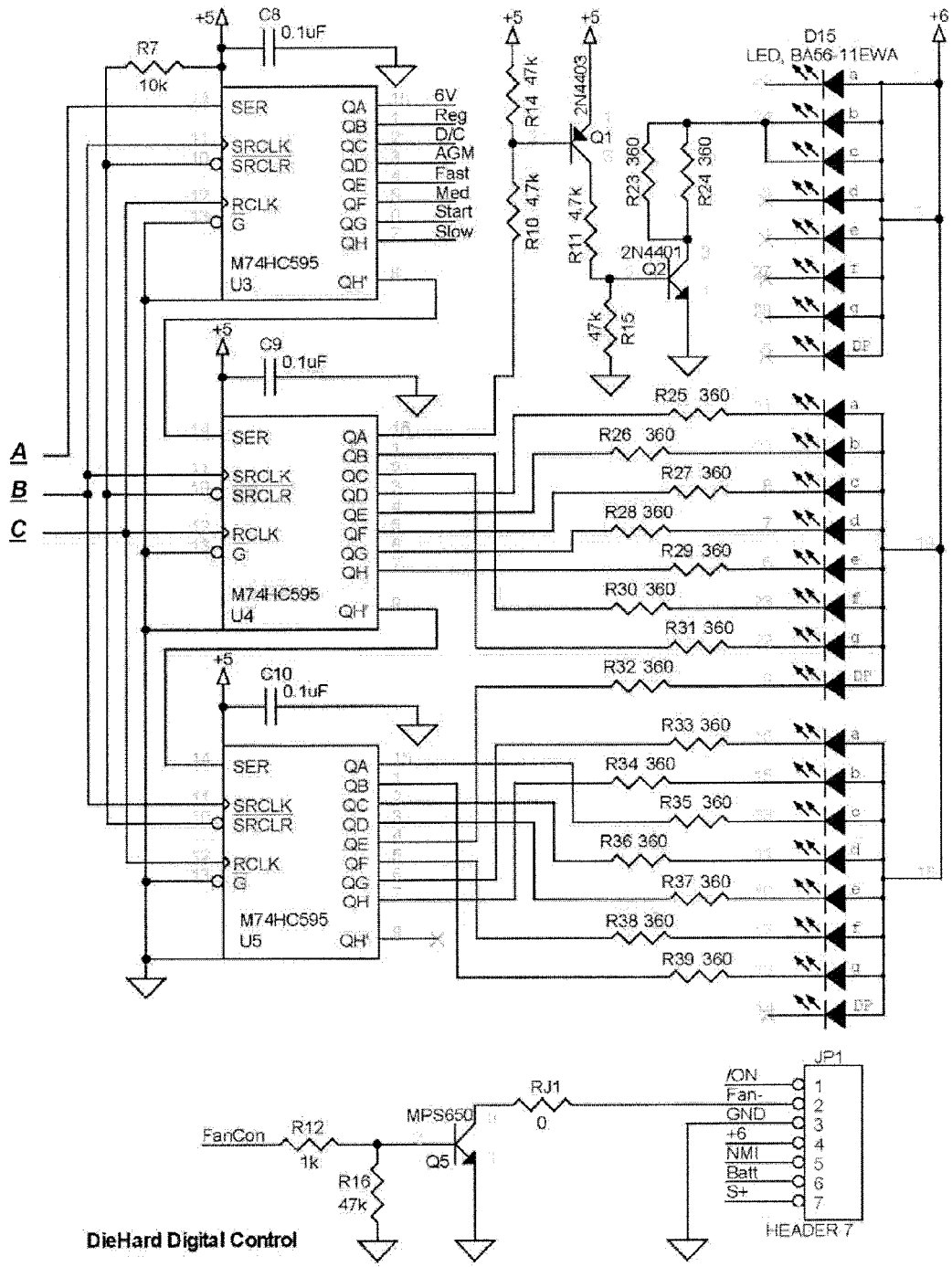
Figure 12:
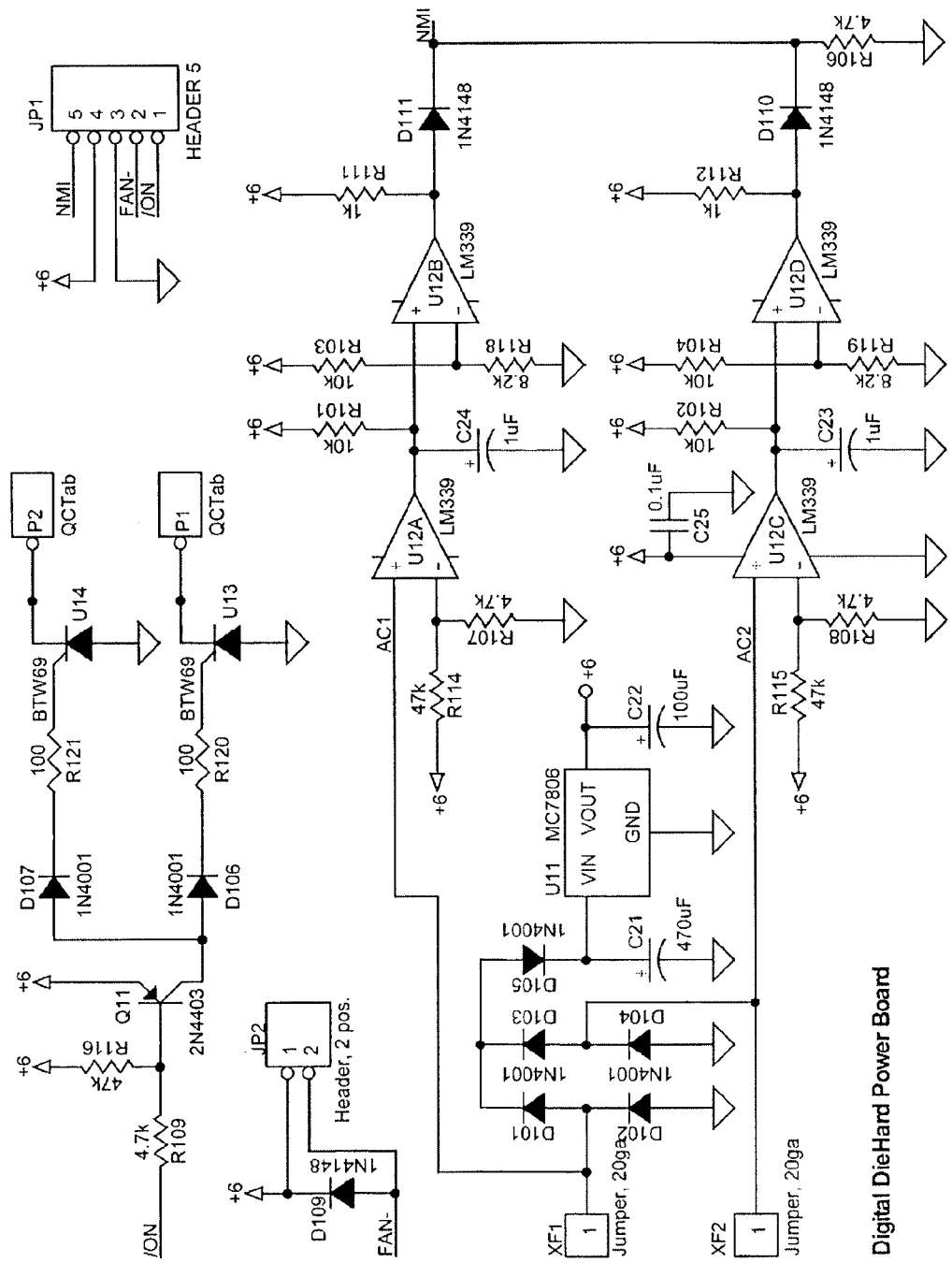
FIG. 12 is an exemplary schematic of a power board for the battery charger illustrated in FIGS. 11A and 11B.
Figure 13A:
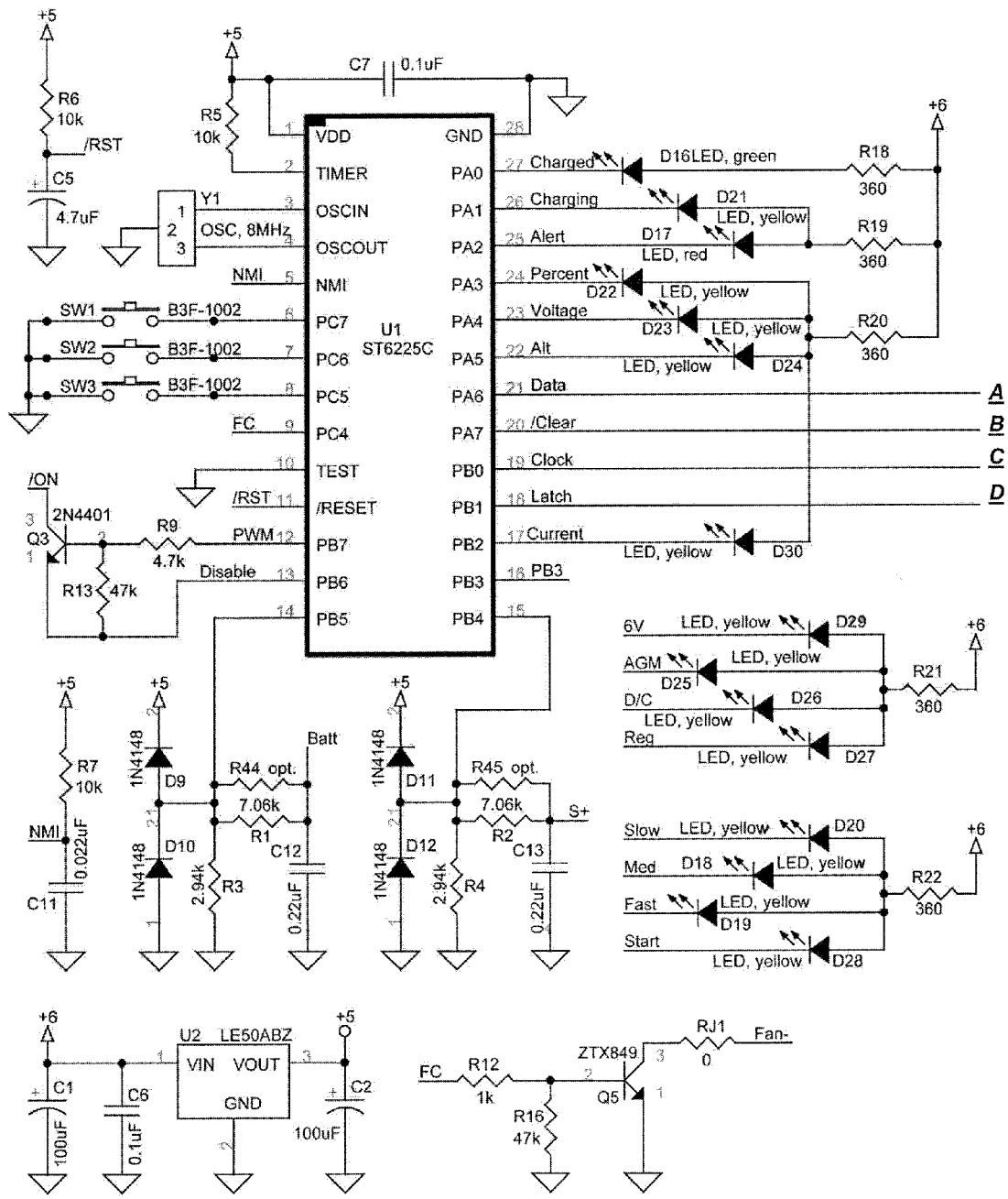
FIGS. 13A and 13B illustrate an exemplary schematic diagram of a control board for a linear-wheeled linear-mode battery charger.
Figure 13:
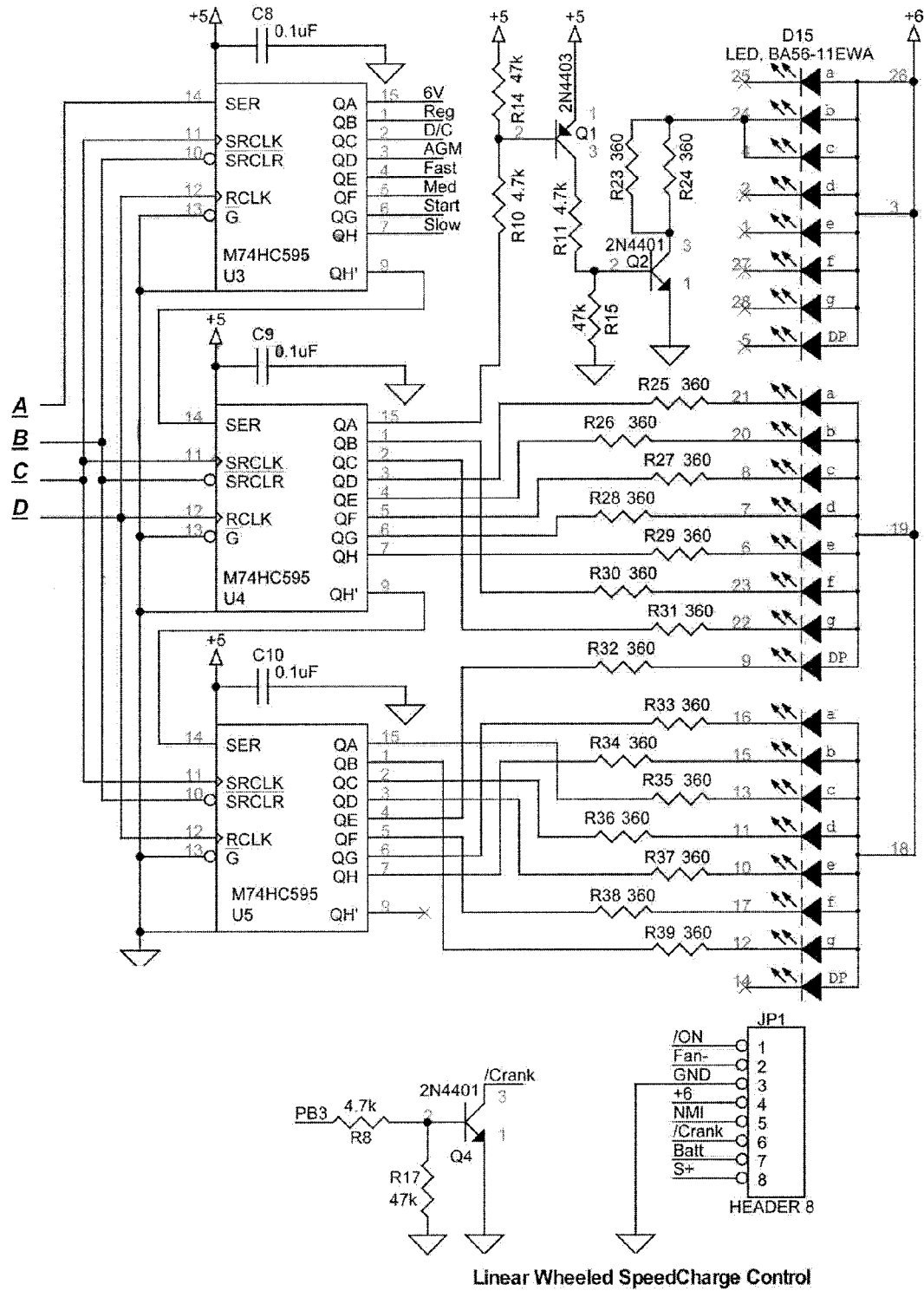
Figure 14:
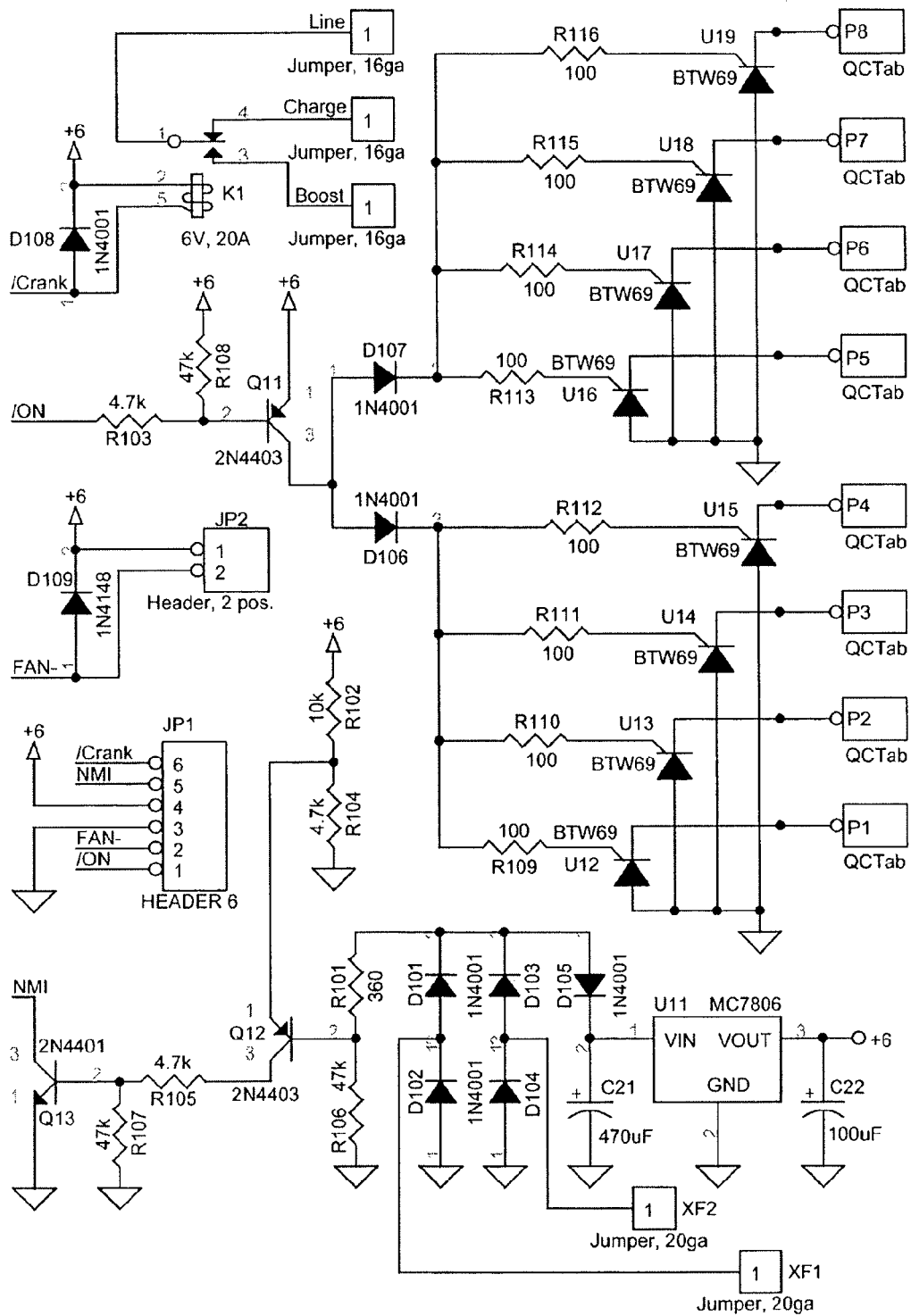
FIG. 14 is an exemplary schematic for the power board for the battery charger illustrated in FIGS. 13A and 13B.

HARDWARE. As mentioned above, the principles of the present invention are applicable to both switched-mode and linear-mode battery chargers. Various exemplary linear- and switched-mode schematics are illustrated in FIGS. 7A-12B. Exemplary switched-mode charger hardware is generally described in U.S. Patent Application Publication US 2005/0088144 A1, published on Apr. 28, 2005, hereby incorporated by reference. FIGS. 7A-10B illustrate exemplary schematics for switched-mode battery chargers, while FIGS. 11A-14 illustrate exemplary schematics for linear-mode battery chargers. In particular, FIGS. 7A and 7B illustrate an exemplary schematic for a control board for a 100-amp switched-mode battery charger. FIGS. 8A and 8B illustrate an exemplary schematic for a power board for the 100-amp switched-mode battery charger illustrated in FIGS. 7A and 7B. FIGS. 9A and 9B illustrate an exemplary schematic diagram of a control board for an exemplary 60-amp high-frequency switched-mode-type battery charger. FIGS. 10A and 10B illustrate an exemplary schematic diagram for a power board for the 60-amp battery charger illustrated in FIGS. 9A and 9B. FIGS. 11A and 11B illustrate an exemplary schematic for a control board for a linear-mode battery charger. FIG. 12 is an exemplary schematic of a power board for the battery charger illustrated in FIGS. 11A and 11B. FIGS. 13A and 13B illustrate an exemplary schematic diagram of a control board for a linear-wheeled, linear-mode battery charger. FIG. 14 is an exemplary schematic for the power board for the battery charger illustrated in FIGS. 13A and 13B.

The principles of the present invention apply to virtually any linear- or switched-mode battery chargers or charging circuits. In general, such battery charging circuits, including the various battery charger circuits illustrated in FIGS. 7-14, all include a power circuit and a control circuit. The power circuits under the control of the control circuits are configured to deliver predetermined charging currents. For example, the switched-mode battery charger illustrated in FIGS. 7 and 8 are configured to deliver 2 ampere, 15 ampere, and 40 ampere selectable charging currents and a engine-cranking charging current of 100 amperes. FIGS. 9 and 10 illustrate an exemplary switched-mode battery charger configured to deliver selectable charging currents of 2 amperes and 60 amperes. FIGS. 11A-13B illustrate exemplary linear-mode battery chargers with selectable slow, medium, fast, and starting (or cranking) charging currents.

Referring to FIGS. 7A-14, each of the exemplary battery chargers includes a number of selector switches, SW1, SW2, and SW3, which enable the desired charging current to be selected. As will be discussed in more detail, combinations of these switches may be used for special functions, such as manual mode. The exemplary battery chargers may also include a display and/or indicating lights to indicate the selected charging mode and optionally may be used to indicate a proper start-up sequence.

Each battery charger, whether linear- or switched-mode, includes a microprocessor or microcontroller, for example, an ST Microelectronics Model No. ST6225C. as generally illustrated in FIGS. 7A, 7B, 9A, 9B, 11A, 11B, 13A, and 13B. The microcontroller is used for controlling the battery charger and executes the software discussed below. As part of that control, the microcontroller monitors whether the status of the switches SW1, SW2, and SW3 and also drives the indicating lights, as will be discussed in more detail below.

It should also be understood that the principles of the invention are also applicable to battery chargers that only charge at a single charging level. In other words, the principles of the invention are applicable to battery chargers in which the charging current is not selectable. All of such configurations are considered to be within the scope of the present invention.

SOFTWARE. The source code for the various battery chargers is provided below. In particular, the source code identified in the file 6,000-P8·asm and 10,000-PA·asm is for the 60- and 100-amp switched-mode battery chargers illustrated in FIGS. 9A, 9B, 10A, 10, B, and 7A, 7B, 8A, 8B, respectively. The source code files identified as 71223D·asm, 71224D·asm, and 30060·asm are useful with the linear-mode battery charger illustrated in FIGS. 11A-14.

Figure 15:
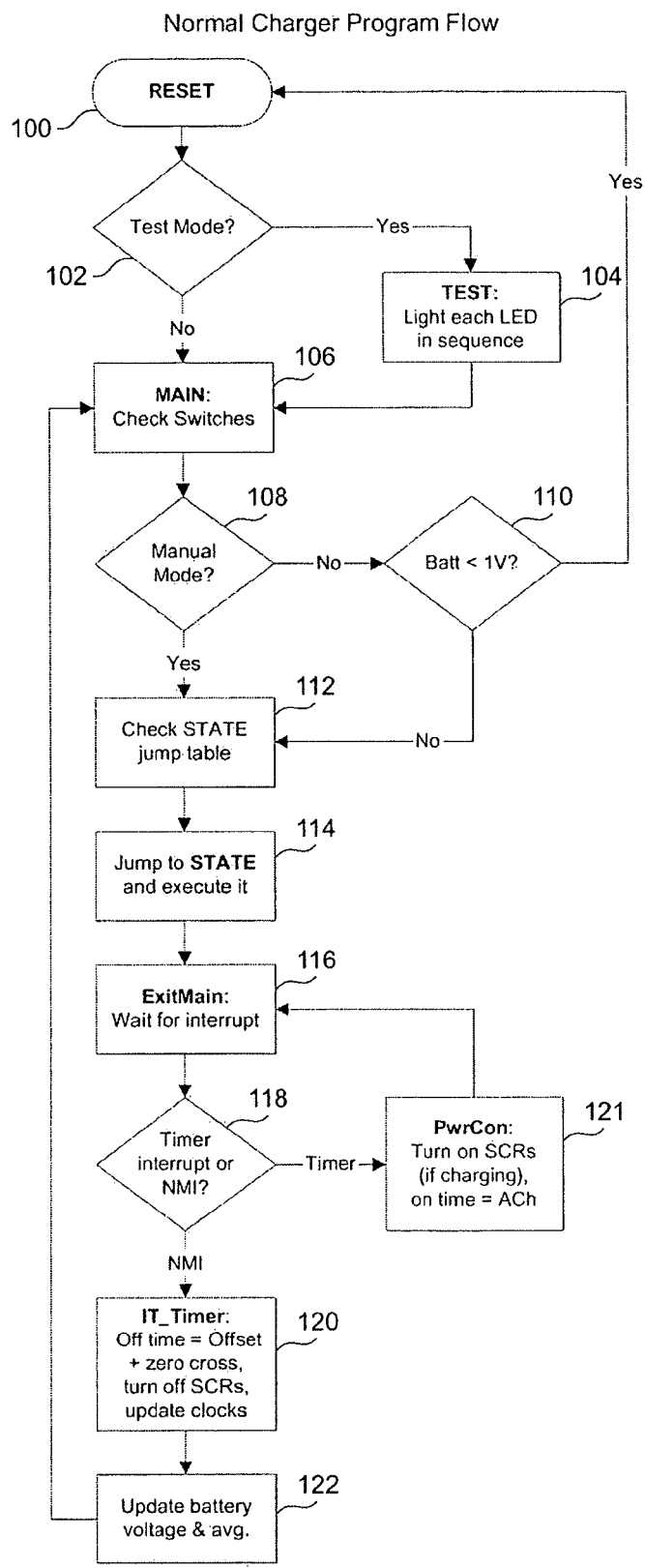
FIG. 15 is an exemplary flow diagram for a linear-mode battery charger illustrating the overall control loop.
Figure 16:
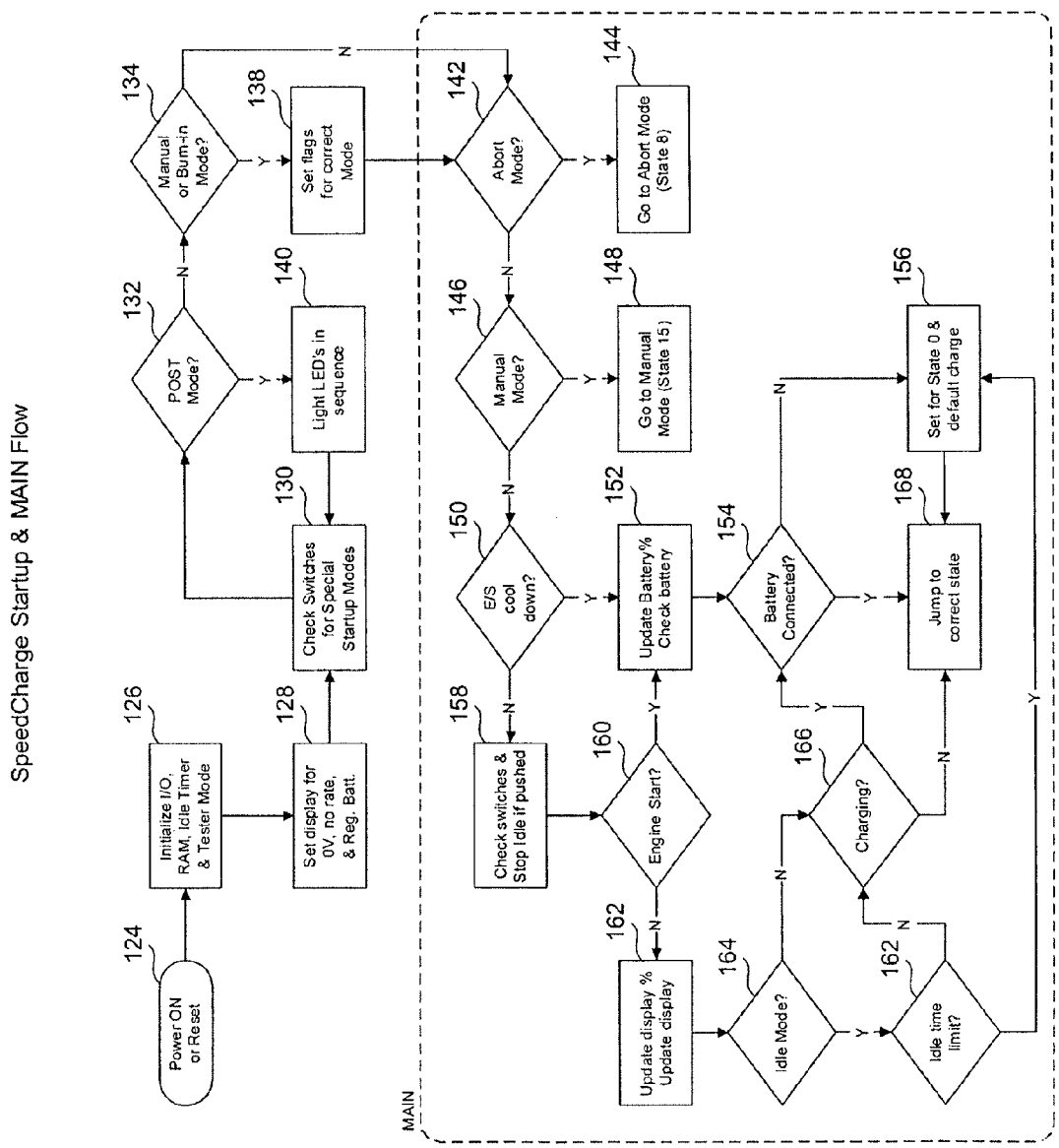
FIG. 16 is an exemplary flow diagram for a linear-mode or high frequency battery charger illustrating the main control loop.
Figure 17:
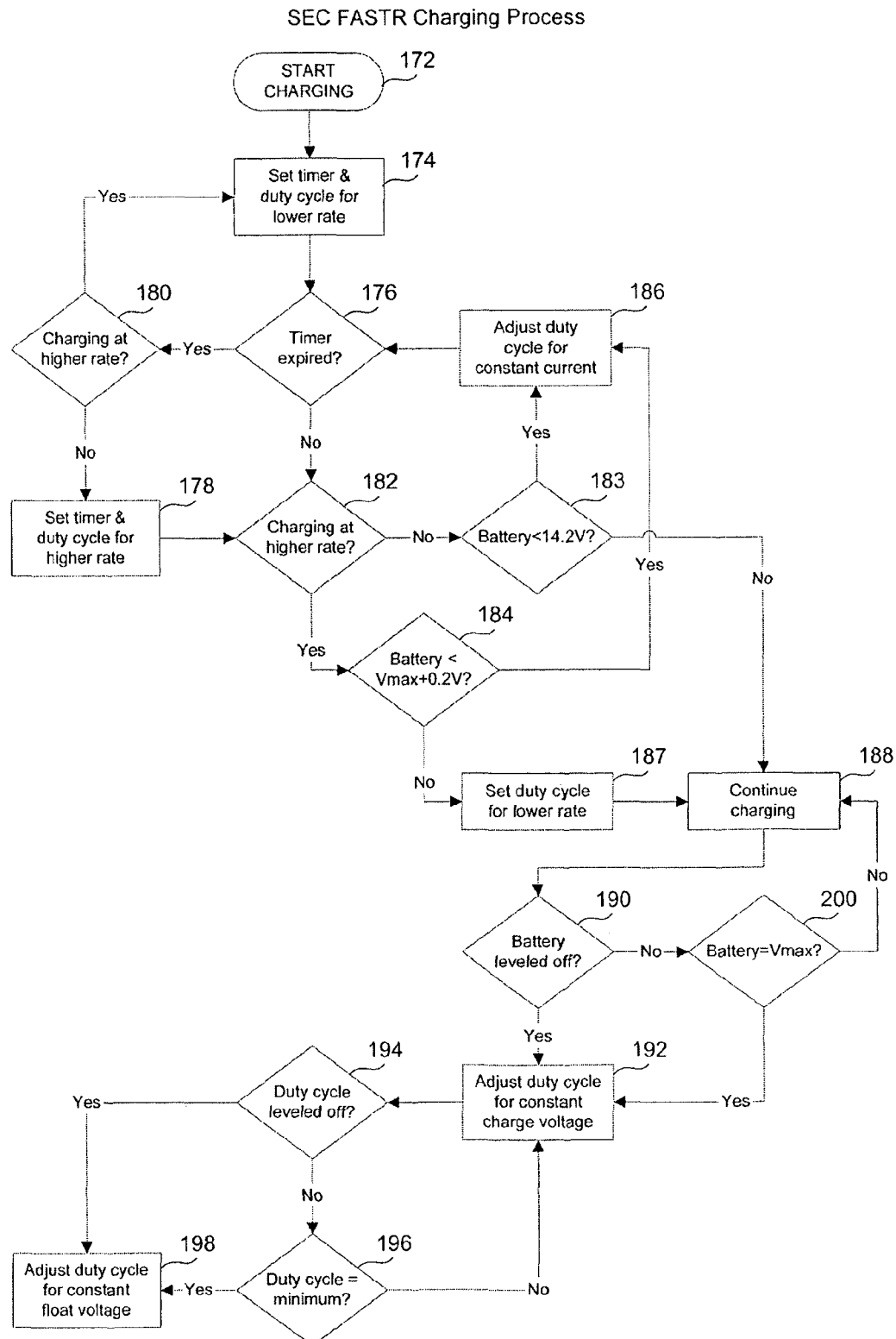
FIG. 17 is an exemplary flow diagram for a linear-mode or high frequency battery charger illustrating a fast charge method in accordance with the present invention.

Exemplary flow charts for the battery charger in accordance with the present invention are also illustrated in FIGS. 15-17. Although FIGS. 15 and 17 apply to linear-mode battery chargers, except for the step of turning on SCRs, these FIGS. 15 and 17 apply generally to switched-mode battery chargers as well. FIGS. 16 and 18 apply to both linear- and switched-mode battery chargers.

Referring first to FIG. 15, an overall control loop is illustrated. The control loop runs continuously any time the battery charger is powered up. In particular, step 100 illustrates a power-up or reset condition. After power up or reset, the system checks whether the battery charger has been placed in a Test Mode in step 102. The test mode may be initiated, for example, by a depression of a test mode switch (not shown) or by depressing a combination of the switches SW1, SW2, SW3, mentioned above. If the battery charger has been placed in a test mode, the system lights up each of the indicating lights (e.g., LEDs) in sequence in step 104 and transfers control to the main control loop in step 106, illustrated in FIG. 16.

In step 108, the system checks whether the battery charger has been placed in a Manual Mode. The Manual Mode may be selected by a separate switch (not shown) or by depressing a combination of the switches SW1, SW2, SW3 or by depressing one or more of the switches SW1, SW2, SW3 for a predetermined time period. In a Manual Mode, the battery charger is turned on for a predetermined time period, irrespective of whether a battery is connected to the battery charger. If the battery charger is not in the Manual Mode, the system checks in step 110 whether a battery is connected to the battery charger by checking whether the voltage of the battery charger output terminals is less than a predetermined value, for example, less than 0.1 volts DC. If so, the system assumes no battery is connected to the battery charger terminals and loops back to step 100. If the voltage at the battery charger terminals is greater than, for example, 0.1 volts DC, the system assumes a battery is connected to the battery charger terminals and proceeds to steps 112, 114, and 116, which illustrate various steps in the Main program loop, illustrated in FIG. 16.

In step 116, the system exits the main loop. In step 118, the system awaits a timer interrupt or a non-maskable interrupt (NMI). In particular, the microcontroller measures the incoming AC power line and generates a NMI in response to a zero crossing. The NMI is used to turn off the SCRs. The NMI also initiates a software timer. When the timer times out, the SCRs are turned on in step 121. After the SCRs are turned off, the battery voltage is read and stored in step 122. A running average of the battery voltage may also be maintained in step 122.

FIG. 16 is a flow diagram of the main control loop. Initially, the system is initiated on power up or reset in step 124. Upon power up or reset, the battery charger is initialized in step 126 by initializing the I/O, RAM, idle timer, and the tester mode. Once the battery charger is initialized, any battery displays are initialized in step 128. Next in step 130, the status of the switches SW1, SW2, SW3 are checked for special startup modes. For example, in a linear-mode battery charger, the system checks whether the "slow," "medium," or "fast" charging modes have been selected by way of the switches; SW1, SW2, SW3. In step 132, the system checks whether the battery charger is in a Power On Self Test (POST) Mode. If not, the system checks in step 134 whether the battery charger is in a Manual Mode, as discussed above. If not, the system enters the main program loop, shown within the dashed box 136. If the system determines that the Manual Mode was selected, software flags are set in step 138 before the system enters the main program loop 136.

Alternatively, if the system determines in step 132 that the battery charger is in the POST Mode, the various indicating lights or LEDs are lit in sequence in step 140. After the LEDs are lit, the system returns to step 130 and checks the switches SW1, SW2, SW3 for a selected charge rate. Next, the system again checks whether the battery charger is in the POST Mode, as discussed above. Assuming that the system is not in the POST Mode or in the Manual Mode, the battery charger enters the main control loop 136.

The entry into the main control loop begins at step 142, where the system checks whether the battery charger is in an abort mode, for example, due to temporary loss of incoming AC power. If so, the system proceeds to the Abort Mode (State 8). Next, the system checks whether the battery charger is in a Manual Mode in step 146. If so, the battery charger assumes the Manual Mode (State 15) in step 148.

In step 150, the system checks whether the battery charger is cooling down after an engine start, i.e, whether a predetermined time period has passed since the battery charger provided 100 amperes of current to start an automobile engine. If so, the system determines the battery capacity in step 152, for example, as a percentage. After the battery capacity is checked, the system checks in step 154 whether a battery is connected to the battery charger terminals, as discussed above, in step 154 and charges the battery in accordance with the selected charge rate in step 168. If not, the system assumes a default charging state (State 0) in step 156.

If the system determines in step 150 that the battery charger is not in an engine cool-down mode, as discussed above, the system checks in step 158 whether the switches SW1, SW2, SW3 for specific charging rates, i.e, fast, medium, or slow, have been depressed. If so, the Idle Mode, i.e, a mode when no charging rate is selected, is terminated. Next, in step 160, the battery checks whether an engine start mode has been selected. If so, the system proceeds to step 152 and updates the battery capacity. If not, the system proceeds to step 162 and updates any display of the battery capacity. Afterwards, the system checks in step 164 whether the battery charger entered the Idle Mode, i.e, charge rate switches are de-selected. If not, the system checks in step 166 if the battery charger is currently charging a battery. If so, the system checks in step 154 whether a battery is connected to the battery charger. If so, the system jumps to the state corresponding to the selected charge rate in step 168. If the battery charger is not in a charge mode, as determined in step 166, the system proceeds to step 168 and proceeds to the appropriate state.

If the system determines in step 164 that the battery charger is in the idle mode, the system checks in step 170 whether the idle time limit has been exceeded. If so, the system proceeds to step 156 and enters a default charge state. If the idle time limit is not exceeded, the system remains in the idle mode unless the battery charger is charging, as determined in step 166, and a battery is connected to the battery charger terminals, as determined in step 154. If the battery charger is not charging, as determined in step 166, the system proceeds to step 168 and jumps to the appropriate state.

FIG. 17 is a flow diagram which illustrates the control of a battery charger which utilizes the principles of the present invention and provides a charging waveform at two alternating non-zero average DC charging currents, as discussed above. The flow diagram illustrated in FIG. 17 may be configured as a branch from the main program FIGS. 15 and 16, whenever one or more of the charge rates, e.g., slow (2 amperes), medium (15 amperes), or fast (40 amperes) are selected by the selector switches SW1, SW2, SW3.

As mentioned above, the battery charger in accordance with the present invention provides a charging waveform of the charging current at alternating non-zero average DC current values, as discussed above, defining a fast charge mode. In step 174, a lower average DC charging current value is set. Specifically, the duty cycle and timer are set for the lower average DC charging current. For example, with reference to FIG. 5, the duty cycle and time period that the waveform will be supplying an average DC charging current of 10 amperes is set. Next in step 176, the system checks whether the timer for the lower average DC charging current has timed out. If not, the system checks in step 183 whether the battery voltage is less than, for example, 14.2 volts. If the battery voltage is less than 14.2 volts, the duty cycle is set for constant current in step 186. If the battery voltage is greater than 14.2 volts, the system continues charging in step 188.

If the lower rate timer has timed out, the system proceeds to step 178 by way of step 180 and sets the duty cycle and a timer for the higher average DC value. With reference to FIG. 5, this corresponds to the duty cycle and time period that the battery charger supplies 30 amperes. In step 180, the system first determines that the battery charger is not already charging at the higher average DC charging current. If the battery charger is charging at the higher average DC charging current, as determined in step 182, the system checks in step 184 whether the battery voltage is less than Vmax+0.2 volts, for example. If so, the duty cycle is adjusted for a constant average DC charging current in step 186. Alternatively, if the battery is being charged at the lower rate, the system checks if the battery voltage has reached 14.2 volts in step 183. If so, the system proceeds to step 186 and adjusts the duty cycle as discussed above. The system then checks whether the timer for the higher average DC charging level has timed out in step 176. Once the battery voltage exceeds Vmax+0.2 volts, as determined in step 184, the duty cycle for the lower average DC charging current is set in step 186 and the system continues charging in step 188 at the lower average DC charging current. While charging at the lower average DC charging current, after the system has detected a battery voltage greater than Vmax+0.2 volts, the system checks whether the battery voltage has leveled off in step 190. If the battery voltage has leveled off, the duty cycle is adjusted in step 192 for a constant charge voltage, for example, a constant 15.5 volts DC. The system checks in step 194 whether the duty cycle has leveled off. If not, the system checks in step 196 whether the duty cycle was set at a minimum. If not, the system loops back to step 192. If so, the duty cycle is adjusted for a constant float voltage, for example, 13.2 volts in step 198.

If the system determines in step 190 that the battery voltage level has not leveled off, the system checks in step 200 whether the battery voltage=Vmax. If so, the system returns to step 192 and adjusts the duty cycle for a constant charge voltage. If not the system returns to step 188 and continues charging.

Obviously, many modifications and variations of the present invention are possible in light of the above teachings. Thus, it is to be understood that, within the scope of the appended claims, the invention may be practiced otherwise than as specifically described above.

What is claimed is:

1. A battery charger comprising:
  a pair of battery charger terminals; and
  a microprocessor controlled battery charging circuit to supply a battery charging current to a battery connected across the pair of battery charger terminals,
  wherein said microprocessor controlled battery charging circuit periodically measures a voltage across the pair of battery charger terminals, defining a measured voltage,
  wherein said microprocessor controlled battery charging circuit does not supply the battery charging current when the measured voltage is less than a first predetermined voltage,
  wherein said microprocessor controlled battery charging circuit operates in (1) a first charging cycle mode while the measured voltage is greater than said first predetermined voltage and less than a second predetermined voltage, and (2) a second charging cycle mode while the measured voltage is greater than or equal to said second predetermined voltage,
  wherein said first charging cycle mode comprises two DC charging values, each having a non-zero average DC value defining a maximum charging current value and a minimum charging current value, said microprocessor controlled battery charging circuit alternating the battery charging current between said maximum charging current value and said minimum charging current value until said battery voltage reaches said second predetermined voltage,
  wherein said maximum charging current value (1) ramps up from said minimum charging current value to said maximum level charging current or (2) ramps down from said maximum charging current value to said minimum charging current value.

2. The battery charger of claim 1, wherein said maximum charging current value (1) ramps up from said minimum charging current value to said maximum level charging current and (2) ramps down from said maximum charging current value to said minimum charging current value.

3. The battery charger of claim 1, wherein the first predetermined voltage is about 0.1 volts DC.

4. The battery charger of claim 1, wherein the second predetermined voltage is a maximum recommended charging voltage by the battery's manufacturer plus a third predetermined voltage.

5. The battery charger of claim 4, wherein the third predetermined voltage is between 0 volts and 0.02% of the maximum recommended charging voltage.

6. The battery charger as recited in claim 1, wherein said maximum charging current value and said minimum charging current values are not constant over a charging cycle.

7. The battery charger as recited in claim 1, wherein the duty cycle of said maximum charging current varies as a function of the battery's state of charge.

8. The battery charger as recited in claim 1, wherein said battery charger is configured with a plurality of selectable charge rates.

9. The battery charger as recited in claim 8, wherein said battery charger is configured so that said maximum charging current value is automatically generated when one or more of said plurality of selectable charge rates are selected.

10. The battery charger as recited in claim 1, wherein said maximum charging current value and said minimum charging current value are constant over a charging cycle.

11. The battery charger as recited in claim 8, wherein said plurality of selectable charge rates includes a slow charging mode, a medium charging mode, and a fast charging mode.

12. The battery charger as recited in claim 1, wherein said plurality of selectable charge rates includes a slow charging mode, a medium charging mode, and a fast charging mode.

13. The battery charger as recited in claim 1, wherein said battery charger is configured to be placed in a test mode.

14. The battery charger as recited in claim 1, wherein said battery charger is configured to determine whether a predetermined time period has passed since the battery charger provided amperes of current, to start an automobile engine.

15. A method for charging a battery, the method comprising the steps of:
  periodically measuring a voltage across a pair of battery charger terminals, defining a measured voltage;
  supplying the battery charging current across the pair of battery charger terminals when the measured voltage is greater than a first predetermined voltage;
  operating in a first charging cycle mode while the measured voltage is greater than said first predetermined voltage and less than a second predetermined voltage; and operating in a second charging cycle mode while the measured voltage is greater than or equal to said second predetermined voltage, wherein said first charging cycle mode comprises two DC charging values, each having a non-zero average DC value defining a maximum charging current value and a minimum charging current value, said microprocessor controlled battery charging circuit alternating the battery charging current between said maximum charging current value and said minimum charging current value until said battery voltage reaches said second predetermined voltage, wherein said maximum charging current value (1) ramps up from said minimum charging current value to said maximum level charging current or (2) ramps down from said maximum charging current value to said minimum charging current value.

16. The method of claim 15, further comprising the step of determining whether a predetermined time period has passed since the battery charger provided amperes of current to start an automobile engine.

17. A battery charger comprising:

a pair of battery charger terminals; and a microprocessor controlled battery charging circuit to provides a plurality of selectable charging modes, at least one of said plurality of selectable charging modes being a fast charge mode, wherein said microprocessor controlled battery charging circuit periodically measures a voltage across the pair of battery charger terminals, defining a measured voltage, wherein said microprocessor controlled battery charging circuit does not supply the battery charging current when the measured voltage is less than a first predetermined voltage, wherein, in said fast charge mode, the battery charger alternates between two different DC charging currents, wherein said DC charging currents have a non-zero average value and define a maximum charging current value and a minimum charging current value, said microprocessor controlled battery charging circuit alternating the battery charging current between said maximum charging current value and said minimum charging current value until said battery's battery voltage exceeds a second predetermined voltage, and charges said battery at a constant current thereafter, said DC charging currents selected to cause said battery to be at least partially charged during said fast charging cycle at a voltage greater than said second predetermined voltage, wherein said maximum charging current value (1) ramps up from said minimum charging current value to said maximum level charging current or (2) ramps down from said maximum charging current value to said minimum charging current value.

18. The battery charger of claim 17, wherein the first predetermined voltage is about 0.1 volts DC.

19. The battery charger of claim 17, wherein the second predetermined voltage is a maximum recommended charging voltage by the battery's manufacturer plus a third predetermined voltage.

20. The battery charger of claim 19, wherein the third predetermined voltage is between 0 volts and 0.02% of the maximum recommended charging voltage.

* * * * *